United States Patent
Segapelli et al.

(10) Patent No.: US 12,022,214 B2
(45) Date of Patent: Jun. 25, 2024

(54) SENSITIVITY-BIASED PIXELS

(71) Applicant: QUALCOMM Incorporated, San Diego, CA (US)

(72) Inventors: Loic Francois Segapelli, San Diego, CA (US); Wenbin Wang, San Diego, CA (US); Nan Cui, San Diego, CA (US); Soman Ganesh Nikhara, Hyderabad (IN); Nikunj Dahyabhai Patel, San Diego, CA (US); Pradeep Veeramalla, Hyderabad (IN); Ankita Anil Kumar Chaudha, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/000,814

(22) PCT Filed: Aug. 6, 2021

(86) PCT No.: PCT/US2021/044941
§ 371 (c)(1),
(2) Date: Dec. 5, 2022

(87) PCT Pub. No.: WO2022/051055
PCT Pub. Date: Mar. 10, 2022

(65) Prior Publication Data
US 2023/0239590 A1 Jul. 27, 2023

(30) Foreign Application Priority Data
Sep. 4, 2020 (IN) .............................. 202021038183

(51) Int. Cl.
*H04N 25/585* (2023.01)
*H04N 25/702* (2023.01)

(52) U.S. Cl.
CPC ......... *H04N 25/585* (2023.01); *H04N 25/702* (2023.01)

(58) Field of Classification Search
CPC ..... H04N 25/585; H04N 25/702; H04N 23/71
See application file for complete search history.

(56) References Cited

U.S. PATENT DOCUMENTS 7,636,115 B2 12/2009 Hong et al.
9,432,647 B2 8/2016 Tajbakhsh et al.
(Continued)

FOREIGN PATENT DOCUMENTS

EP 0981245 A2 2/2000

OTHER PUBLICATIONS

International Search Report and Written Opinion—PCT/US2021/044941—ISA/EPO—Nov. 19, 2021.

*Primary Examiner* — Twyler L Haskins
*Assistant Examiner* — Angel L Garces-Rivera
(74) *Attorney, Agent, or Firm* — QUALCOMM Incorporated

(57) ABSTRACT

Systems, methods, and non-transitory media are provided for automatic exposure control. An example method can include receiving pixel values captured by a photosensor pixel array (PPA) of an image sensor, wherein one or more pixel values from the pixel values correspond to one or more sensitivity-biased photosensor (SBP) pixels in the PPA and one or more saturated pixel values from the pixel values correspond to one or more other photosensor pixels in the PPA; determining, based on the one or more pixel values, an actual pixel value for the one or more pixel values and/or the one or more saturated pixel values; determining an adjustment factor for at least one of the pixel values based on the actual pixel value and a target exposure value; and based on the adjustment factor, correcting an exposure setting asso- (Continued)

ciated with the image sensor and/or at least one of the pixel values.

30 Claims, 10 Drawing Sheets

(56) References Cited

U.S. PATENT DOCUMENTS

| | | |
|---|---|---|
| 9,495,751 B2 | 11/2016 | Wajs |
| 10,419,695 B2 | 9/2019 | Sasago et al. |
| 10,638,055 B2 | 4/2020 | Galor Gluskin |
| 2010/0073527 A1 | 3/2010 | Ichimiya |
| 2018/0176445 A1 | 6/2018 | Iinuma |
| 2018/0313938 A1 | 11/2018 | Okada |

 Photo Sensors 310
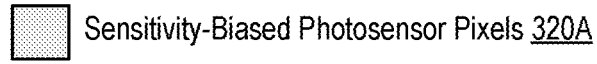 Sensitivity-Biased Photosensor Pixels 320A
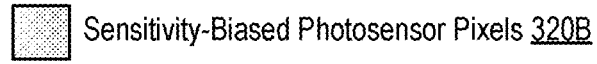 Sensitivity-Biased Photosensor Pixels 320B
402 —  Sensitivity-Biased Photosensor Pixels 320C
404 — 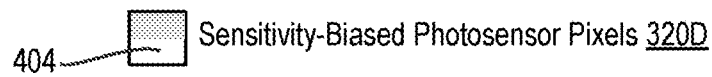 Sensitivity-Biased Photosensor Pixels 320D
406 — 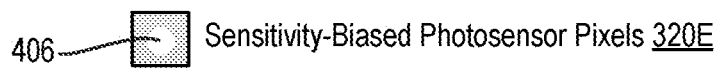 Sensitivity-Biased Photosensor Pixels 320E
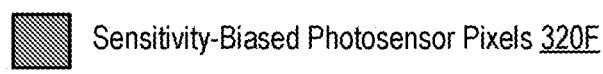 Sensitivity-Biased Photosensor Pixels 320F
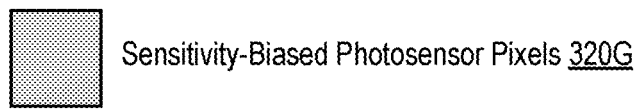 Sensitivity-Biased Photosensor Pixels 320G
 Sensitivity-Biased Photosensor Pixels 320H
FIG. 4

600

RECEIVE A PLURALITY OF PIXEL VALUES OF AN IMAGE CAPTURED BY A PHOTOSENSOR PIXEL ARRAY OF AN IMAGE SENSOR
602

↓

DETERMINE, BASED ON ONE OR MORE PIXEL VALUES CORRESPONDING TO ONE OR MORE SBP PIXELS, AN ESTIMATED ACTUAL PIXEL VALUE FOR THE ONE OR MORE PIXEL VALUES AND/OR ONE OR MORE SATURATED PIXEL VALUES FROM THE PLURALITY OF PIXEL VALUES
604

↓

DETERMINE AN ADJUSTMENT FACTOR FOR AT LEAST ONE OF THE PLURALITY OF PIXEL VALUES BASED ON THE ESTIMATED ACTUAL PIXEL VALUE AND A TARGET EXPOSURE VALUE
606

↓

BASED ON THE ADJUSTMENT FACTOR, CORRECT AN EXPOSURE SETTING ASSOCIATED WITH THE IMAGE SENSOR AND/OR AT LEAST ONE OF THE PLURALITY OF PIXEL VALUES
608

FIG. 6

SENSITIVITY-BIASED PIXELS

TECHNICAL FIELD

The present disclosure generally relates to auto-exposure convergence and high dynamic range imaging.

BACKGROUND

Camera devices with image sensors are commonly integrated into a wide array of electronic devices such as mobile phones, autonomous systems (e.g., autonomous drones, cars, robots, etc.), computers, smart wearables, cameras, and many other devices. The camera devices allow users to capture video and images from a wide variety of electronic devices. The video and images can be captured for recreational use, professional photography, surveillance, and automation, among other applications. The quality of a video or image can depend on the capabilities of the camera device used to capture the video or image and a variety of factors such as exposure. Exposure relates to the amount of light that reaches the image sensor, as determined by shutter speed or exposure time, lens aperture, and scene luminance.

The illumination conditions in a scene, such as the brightness and darkness levels of the scene, can change quickly. In many cases, the exposure settings of the camera device may be unsuitable for the different illumination conditions, which can result in overexposed images, underexposed images, a degradation of the quality of the captured images and/or performance of subsequent image processing algorithms, etc. To limit such issues, the exposure settings of the camera device can be adjusted to account for changes in illumination conditions. However, exposure correction mechanisms can have large processing costs, limited adaptability, increased convergence times, and often require wasteful and inefficient use of multiple exposures to calculate new exposure settings for a scene.

BRIEF SUMMARY

Disclosed are systems, methods, and computer-readable media for automatic exposure control using sensitivity-biased photosensor (SBP) pixels. According to at least one example, a method is provided for automatic exposure control using SBP pixels. The method can include receiving a plurality of pixel values of an image captured by a photosensor pixel array of an image sensor, wherein one or more pixel values from the plurality of pixel values correspond to one or more sensitivity-biased photosensor (SBP) pixels in the photosensor pixel array, and wherein one or more saturated pixel values from the plurality of pixel values correspond to one or more other photosensor pixels in the photosensor pixel array; determining, based on the one or more pixel values corresponding to the one or more SBP pixels, an estimated actual pixel value for the one or more pixel values and/or the one or more saturated pixel values from the plurality of pixel values; determining an adjustment factor for at least one of the plurality of pixel values based on the estimated actual pixel value and a target exposure value; and based on the adjustment factor, correcting an exposure setting associated with the image sensor and/or the at least one of the plurality of pixel values.

According to at least one example, an apparatus is provided for automatic exposure control using SBP pixels. The apparatus can include memory and one or more processors coupled to the memory, the one or more processors being configured to receive a plurality of pixel values of an image captured by a photosensor pixel array of an image sensor, wherein one or more pixel values from the plurality of pixel values correspond to one or more sensitivity-biased photosensor (SBP) pixels in the photosensor pixel array, and wherein one or more saturated pixel values from the plurality of pixel values correspond to one or more other photosensor pixels in the photosensor pixel array; determine, based on the one or more pixel values corresponding to the one or more SBP pixels, an estimated actual pixel value for the one or more pixel values and/or the one or more saturated pixel values from the plurality of pixel values; determine an adjustment factor for at least one of the plurality of pixel values based on the estimated actual pixel value and a target exposure value; and based on the adjustment factor, correct an exposure setting associated with the image sensor and/or the at least one of the plurality of pixel values.

According to at least one example, another apparatus is provided for automatic exposure control using SBP pixels. The apparatus can include means for receiving a plurality of pixel values of an image captured by a photosensor pixel array of an image sensor, wherein one or more pixel values from the plurality of pixel values correspond to one or more sensitivity-biased photosensor (SBP) pixels in the photosensor pixel array, and wherein one or more saturated pixel values from the plurality of pixel values correspond to one or more other photosensor pixels in the photosensor pixel array; determining, based on the one or more pixel values corresponding to the one or more SBP pixels, an estimated actual pixel value for the one or more pixel values and/or the one or more saturated pixel values from the plurality of pixel values; determining an adjustment factor for at least one of the plurality of pixel values based on the estimated actual pixel value and a target exposure value; and based on the adjustment factor, correcting an exposure setting associated with the image sensor and/or the at least one of the plurality of pixel values.

According to at least one example, a non-transitory computer-readable medium is provided for automatic exposure control using SBP pixels. The non-transitory computer-readable medium can include instructions which, when executed by one or more processors, cause the one or more processors to receive a plurality of pixel values of an image captured by a photosensor pixel array of an image sensor, wherein one or more pixel values from the plurality of pixel values correspond to one or more sensitivity-biased photosensor (SBP) pixels in the photosensor pixel array, and wherein one or more saturated pixel values from the plurality of pixel values correspond to one or more other photosensor pixels in the photosensor pixel array; determine, based on the one or more pixel values corresponding to the one or more SBP pixels, an estimated actual pixel value for the one or more pixel values and/or the one or more saturated pixel values from the plurality of pixel values; determine an adjustment factor for at least one of the plurality of pixel values based on the estimated actual pixel value and a target exposure value; and based on the adjustment factor, correct an exposure setting associated with the image sensor and/or the at least one of the plurality of pixel values.

In some aspects, the method, apparatus, and non-transitory computer-readable medium described above can generate the image based on the estimated actual pixel value, the one or more saturated pixel values, and/or at least a portion of the plurality of pixel values modified based on the adjustment factor.

In some aspects, the method, apparatus, and non-transitory computer-readable medium described above can identify the one or more pixel values corresponding to the one or more SBP pixels. In some examples, the one or more pixel values can be identified based on a difference between the one or more pixel values and the one or more saturated pixel values, a location of the one or more SBP pixels, and/or a location of the one or more pixel values within an image array comprising the plurality of pixel values.

In some examples, determining the estimated actual pixel value can include multiplying the one or more pixel values corresponding to the one or more SBP pixels by an SBP light sensitivity factor calculated based on a percentage of light the one or more SBP pixels are configured to filter. In some cases, determining the adjustment factor can include dividing the target exposure value by the estimated actual pixel value.

In some cases, each SBP pixel from the one or more SBP pixels can include a photosensor pixel with a mask configured to filter a portion of light before the portion of light reaches the photosensor pixel, a photosensor pixel with a different aperture than the one or more other photosensor pixels in the photosensor pixel array, and/or a photosensor pixel configured to convert photons to electrical charges at a modified rate.

In some cases, the one or more SBP pixels are located at one or more borders of the photosensor pixel array, the one or more borders including a bottom row, a top row, a left column, and/or a right column. In some cases, the one or more SBP pixels are located at one or more non-border regions of the photosensor pixel array.

In some examples, the one or more saturated pixel values can include oversaturated pixel values and the one or more SBP pixels can have a reduced light sensitivity. In some examples, the one or more SBP pixels can include an SBP photosensor pixel without a light filter, an SBP pixel with a larger aperture than other photosensor pixels in the photosensor pixel array, and/or an SBP photosensor pixel configured to convert photons to electrical charges at an increased rate; and the one or more saturated pixel values can include one or more undersaturated pixel values. In some cases, the one or more SBP pixels can include a first set of pixels and a second set of pixels, wherein the first set of pixels have a reduced light sensitivity and the second set of pixels have an increased light sensitivity.

In some aspects, any of the apparatuses described above can include one or more image sensors. In some examples, any of the apparatuses described above can be, or can be part of, a camera (e.g., an IP camera), a mobile device (e.g., a mobile telephone or so-called "smartphone," or other mobile device), a wearable device, an extended reality device (e.g., a virtual reality (VR) device, an augmented reality (AR) device, or a mixed reality (MR) device), a personal computer, a laptop computer, a server computer, or other device. In some aspects, any of the apparatuses described above can include a camera or multiple cameras for capturing one or more images. In some aspects, any of the apparatuses described above can further include a display for displaying one or more images, notifications, and/or other displayable data. In some aspects, any of the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the above-recited and other advantages and features of the disclosure can be obtained, a more particular description of the principles described above will be rendered by reference to specific embodiments thereof which are illustrated in the appended drawings. Understanding that these drawings depict only example embodiments of the disclosure and are not to be considered to limit its scope, the principles herein are described and explained with additional specificity and detail through the use of the drawings in which:

FIG. 4 illustrates various example configurations of photosensor pixels, in accordance with some examples of the present disclosure.

FIG. 6 is a flowchart illustrating an example method for automatic exposure control using sensitivity-biased photosensor pixels, in accordance with some examples of the present disclosure.

DETAILED DESCRIPTION

Figure 1:
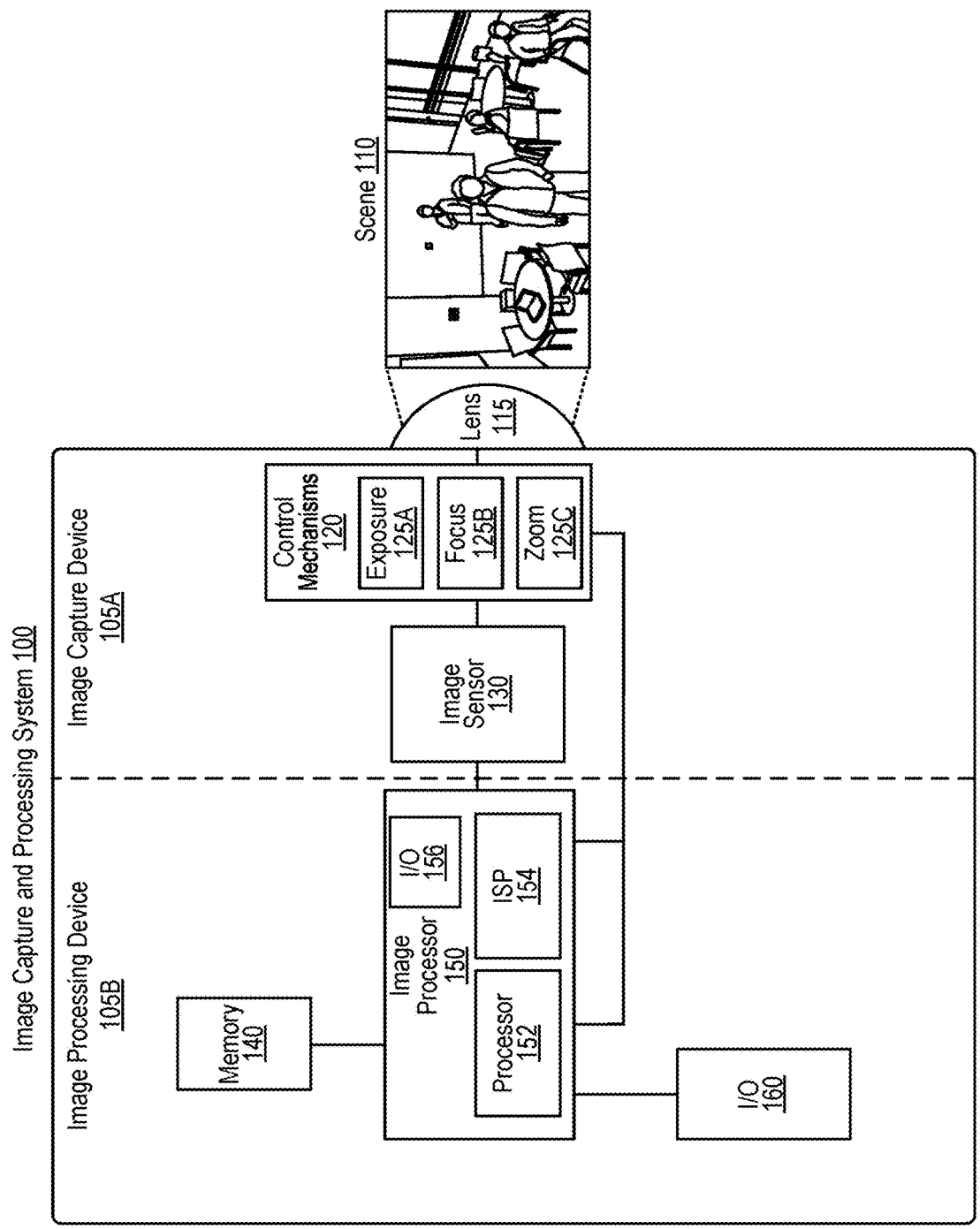
FIG. 1 is a block diagram illustrating an architecture of an example image capture and processing system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

In video and imaging, exposure refers to the amount of light per unit area that reaches an image sensor as determined by shutter speed, lens aperture, gain, and luminance, for example. Within a given exposure, the image sensor provides a certain amount of dynamic range, such as pixel values from 0 to 255 as further described below. Generally, an image sensor has a limited exposure range and a limited dynamic range, which limits the range of pixel values that can be represented. For example, if an image sensor can represent a maximum 255 (8 bit) pixel value, then any scene element having a brightness that exceeds the combination of exposure and sensor dynamic range would cause the pixel value to cap at 255 and be recorded as white (overexposed) rather than the accurate color and brightness details or values. Similarly, any scene element having a brightness that is less than the combination of exposure and sensor dynamic range would result in a minimum pixel value of 0 and would be recorded as black (underexposed) rather than the accurate details or values. Accordingly, in a very bright scene where the pixel values may exceed the maximum range of an image sensor, the pixels for that part of the scene may be recorded as white, and in a very dark scene where the pixel values may be 0, the pixels for that part of the scene may be recorded as black.

Moreover, the image captured by the image sensor can be considered to be oversaturated when the image has a loss of highlight detail, in which case bright parts of the image (or the image as a whole) may be white (e.g., washed out) or clipped, and the image can be considered to be undersaturated when the image has a loss of shadow detail, in which case dark may be indistinguishable from black or compressed. When one or more portions of the image exceed the maximum pixel value range supported by the image sensor (e.g., when one or more portions of the image are oversaturated/overexposed or undersaturated/underexposed), the image sensor may not be able to determine the actual pixel values of those portions of the image or properly render the scene captured by the image without clipping pixel values so the clipped values do not exceed the maximum pixel value ranges. With less accurate pixel values, the accuracy of the exposure settings calculated for the image sensor and the quality of the image can be reduced.

Furthermore, the illumination conditions in a scene being captured by a camera device, such as the brightness and darkness levels of the scene, can change quickly. In many cases, the exposure settings of the camera device may be unsuitable for the different illumination conditions. The unsuitable exposure settings of the camera device can lead to overexposed/oversaturated images, underexposed/undersaturated images, a degradation of the quality of the captured images and/or performance of subsequent image processing algorithms, etc. As previously noted, in many cases, the brightness levels of the scene can exceed the dynamic range of the camera device, and the camera device may require multiple exposures to render the scene and for exposure convergence from dark scenes to bright scenes and vice versa. In some cases, the camera device can perform high dynamic range for exposure convergence. However, clipping operations can negatively impact metrics used to calculate exposure settings and consequently the exposure convergence.

For example, underexposure and overexposure can cause problems with video preview exposure convergence. Auto exposure (AE) involves converging exposure when a scene changes from bright to dark or vice versa. However, if the pixel values in a captured image are clipped (e.g., becomes when a scene abruptly changes from dark to bright, the image becomes white or too bright) or compressed (e.g., because when a scene abruptly changes from bright to dark, the image becomes black or too dark), the statistics used to calculate exposure settings are impacted and AE may instead need to take a general or educated guess of the appropriate exposure settings by increasing or decreasing exposure without knowing a more exact or accurate target. Accordingly, to calculate exposure settings for an image sensor, the image sensor may need more accurate statistics that are not based on pixel values that have clipped (e.g., too bright) or compressed (e.g., too dark) values.

In some examples, the technologies described herein can implement sensitivity-biased photosensor (SBP) pixels to address these and other challenges. The SBP pixels can be implemented in a photosensor pixel array used by an image sensor to capture image data for a scene. The SBP pixels can include photodiodes to capture and measure light in a scene, and can be configured to have a reduced or increased light sensitivity which can allow the SBP pixels to capture more brightness levels in a dark scene (and/or an underexposed image) and less brightness levels in a bright scene (and/or an overexposed image). Such a property of SBP pixels can prevent the pixel values measured by an SBP pixel with a reduced light sensitivity from becoming oversaturated/overexposed in a bright scene, and can also prevent the pixel values measured by an SBP pixel with an increased light sensitivity from becoming undersaturated/underexposed in a dark scene. As used herein, the term "saturated" can include oversaturated/overexposed and/or undersaturated/underexposed.

The pixel values calculated by the SBP pixels can also be used to calculate more accurate brightness levels in scenes where other photosensor pixels are unable to capture actual brightness levels for a variety of reasons. For example, other photosensor pixels may be unable to capture actual brightness levels when the brightness levels in the scene exceed the maximum saturation/exposure levels of the image sensor, when the light sensitivity of the other photosensor pixels is too low to capture more brightness levels in a dark scene, and/or in other cases.

The more accurate pixel values calculated by the SBP pixels can be used to calculate more accurate exposure settings for the image sensor, as they can account for brightness levels that other photosensor pixels may not. The more accurate exposure settings can not only improve image quality, but can also decrease exposure convergence time. Moreover, the SBP pixels can provide such exposure settings and reduced exposure convergence time without requiring clipping operations or multiple exposures, which can decrease efficiency and waste image data that could otherwise be used for other imaging tasks and benefits. The pixel values from SBP pixels can thus be used to improve the quality and exposure of generated images, as well as the performance of subsequent image processing algorithms.

In some examples, to increase or decrease the light sensitivity of an SBP pixel and obtain more accurate pixel values for a scene, the SBP pixel can implement a mask or filter configured to filter a certain amount of light, a larger or smaller aperture, and/or a modified rate for converting photons to electrical charges. For example, an SBP pixel can be made less sensitive to light by applying a mask or filter that blocks a certain amount of light on the SBP pixel, and can be made more sensitive to light by not applying a mask or filter that blocks light on the SBP pixel, increasing its aperture, converting photons to electrical charges at an increased rate, and/or combining multiple photodiodes to create a super-diode as shown in FIG. 2C.

In an illustrative example involving a bright scene, one or more SBP pixels can implement a mask or filter to block a certain amount of light. Thus, while other photosensor pixels in the bright scene may become oversaturated/overexposed by the light in the scene, the less sensitive SBP pixels may filter a certain amount of the light and provide a lower pixel value that is not oversaturated/overexposed. In an illustrative example, to calculate the accurate pixel value for the less sensitive SBP pixels, the pixel value captured by the less sensitive SBP pixels can be multiplied by the amount of light such SBP pixels are configured to filter. To illustrate, if an SBP pixel is configured to capture half of the light and filter the other half of the light received, and the SBP pixel captures a pixel value of 500, then the pixel value of 500 can be multiplied by 2 (e.g., based on the SBP pixel being configured to filter half of the light) to estimate an actual pixel value of 1000. The pixel value of 1000 can be a more accurate pixel value and can be used to infer the actual pixel value of oversaturated/overexposed pixel values in the image.

Moreover, to determine an adjustment factor (also referred to as an adjustment value) that can be used to determine a more accurate exposure, a target exposure value can be divided by the actual pixel value calculated for the pixel value associated with the SBP pixel (e.g., 1000 in the previous example). To illustrate, based on the previous example, if the target value is 50, the target value of 50 can be divided by the actual pixel value 1000 to yield an adjustment factor of 0.05. The adjustment factor of 0.05 can then be used to adjust the exposure settings of the image sensor and/or correct the pixel values for oversaturated/overexposed pixels.

In an illustrative example involving a dark scene, one or more SBP pixels can be implemented without a filter, with a larger aperture, and/or with an increased rate of converting photons to electrical charges, in order to capture more light and brightness levels in the dark scene. Thus, while other photosensor pixels in the dark scene may become undersaturated/underexposed by the lack or limited of light in the dark scene, the more sensitive SBP pixels may capture more light and brightness levels, and provide a higher pixel value that is not undersaturated/underexposed. The higher pixel value can be used to infer a more accurate pixel value for undersaturated/underexposed pixels. In some cases, the higher pixel value can be adjusted as previously explained based on the light sensitivity of the SBP pixel (for example, by reducing the pixel value proportionate to an increase in sensitivity of the SBP pixel). In other cases, the higher pixel value can be used without further adjustment. Moreover, to determine an adjustment factor for exposure settings, a target exposure value can be divided or multiplied by the pixel value for the SBP pixel.

In some cases, SBP pixels in the photosensor pixel array can be implemented in one or more borders of the photosensor pixel array. For example, one or more SBPs can be implemented on a top and/or bottom row of the photosensor pixel array and/or on a left and/or right column of the photosensor pixel array. Parts of the photosensor pixel array outside of the borders can be referred to as non-border regions. Often, a camera system reads pixel values on a line-by-line basis. Accordingly, by placing the SBP pixels on the border(s) of the photosensor pixel array, the camera system can quickly recognize the pixel values from the SBP pixels as pixel values are read in the line-by-line basis, and can place the pixel values from the SBP pixels in a buffer for use as previously described, rather than performing more expensive computations to detect or index such SBPs if otherwise located in other regions of the photosensor pixel array.

Figure 7:
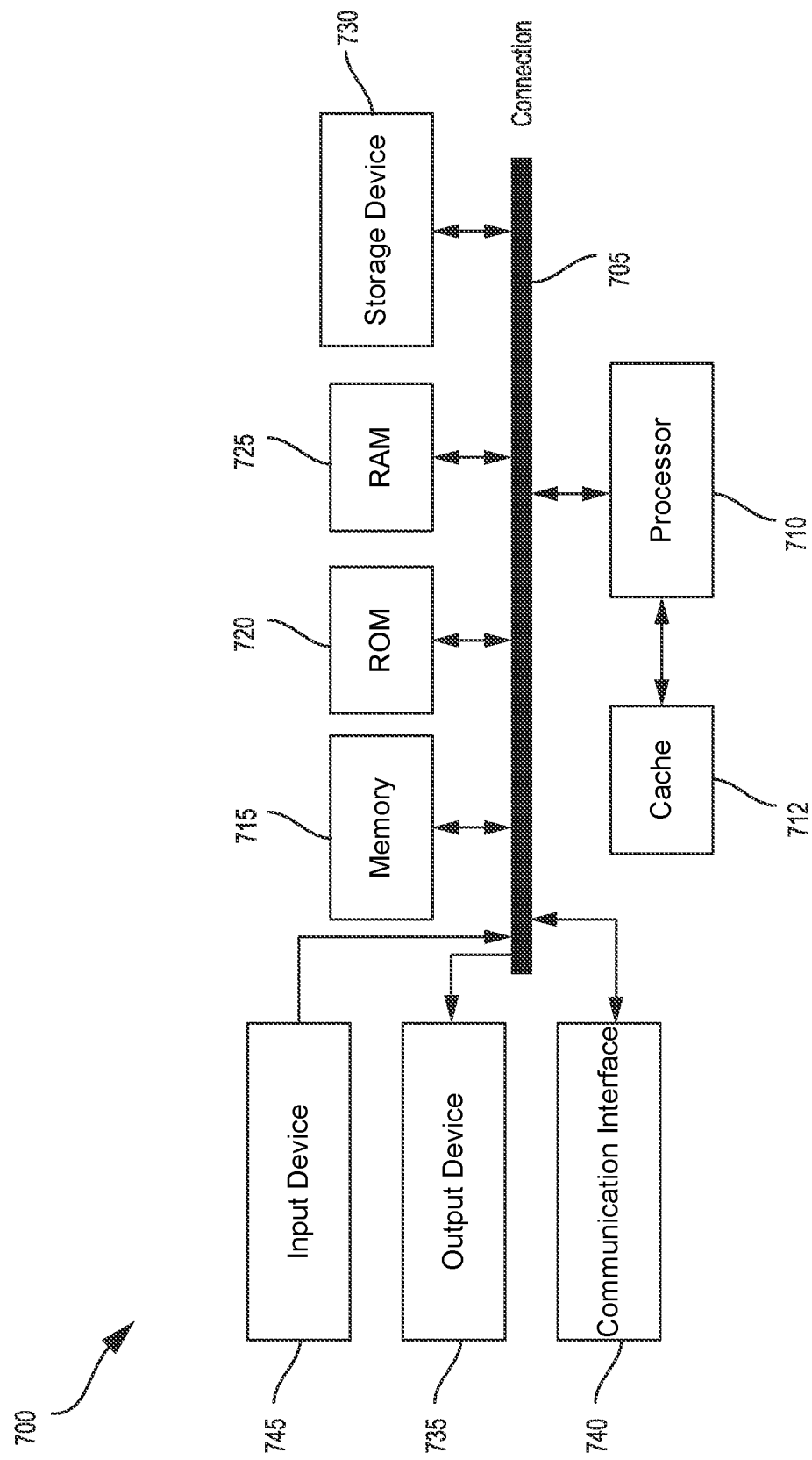
FIG. 7 illustrates an example computing device architecture, in accordance with some examples of the present disclosure.

The technology described herein will be described in greater detail in the following disclosure. The discussion begins with a description of example systems, techniques, and applications for implementing sensitivity-biased photosensor pixels and performing automatic exposure control using sensitivity-biased photosensor, as illustrated in FIG. 1 through FIG. 5. A description of an example method for automatic exposure control using sensitivity-biased photosensor pixels, as illustrated in FIG. 6, will then follow. The discussion concludes with a description of an example computing device architecture including example hardware components suitable for automatic exposure control using sensitivity-biased photosensor pixels, as illustrated in FIG. 7. The disclosure now turns to FIG. 1.

FIG. 1 is a block diagram illustrating an architecture of an example image capture and processing system 100. The image capture and processing system 100 can include various components used to capture and process images of scenes, such as one or more images of scene 110. The image capture and processing system 100 can capture standalone images (or photographs) and/or can videos that include multiple images (or video frames) in a particular sequence. The system 100 can include a lens 115 that faces a scene 110 and receives light from the scene 110. The lens 115 can bend the light toward an image sensor 130. The light received by the lens 115 can pass through an aperture controlled by one or more control mechanisms 120, and subsequently received by the image sensor 130.

The one or more control mechanisms 120 can control one or more features, mechanisms, components, and/or settings such as, for example, exposure, focus, zoom, among others. For example, the control mechanisms 120 can include one or more exposure control mechanisms 125A, one or more focus control mechanisms 125B, and/or one or more zoom control mechanisms 125C. The one or more control mechanisms 120 may also include other control mechanisms, such as control mechanisms for controlling analog gain, flash, high dynamic range (HDR), depth of field, and/or other image capture properties. The one or more control mechanisms 120 can control features, mechanisms, components, and/or settings based on information from the image sensor 130, information from the image processor 150, and/or other information.

The focus control mechanism 125B can obtain a focus setting. In some examples, focus control mechanism 125B can store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the system 100, such as one or more microlenses over each photodiode of the image sensor 130. Each microlens can bend the light received from the lens 115 toward the corresponding photodiode before the light reaches the photodiode. The focus setting may be referred to as an image capture setting and/or an image processing setting.

The exposure control mechanism 125A can obtain, determine, and/or adjust one or more exposure settings. In some cases, the exposure control mechanism 125A can store the one or more exposure settings in a memory register. Based on the one or more exposure settings, the exposure control mechanism 125A can control a size of the aperture (e.g., aperture size), a duration of time for which the aperture is open (e.g., exposure time or shutter speed), a sensitivity of the image sensor 130 (e.g., ISO speed or film speed), analog gain applied by the image sensor 130, and/or any other exposure settings. The one or more exposure settings may be referred to as an image capture setting and/or an image processing setting.

The zoom control mechanism 125C can obtain a zoom setting. In some examples, the zoom control mechanism 125C can store the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting.

The image sensor 130 can include one or more arrays of photodiodes or other photosensitive elements. Each photodiode measures an amount of light that eventually corresponds to a particular pixel in an image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and/or may use different photodiodes throughout the array (in some cases vertically stacked). In some cases, different photodiodes in the array can have different spectral sensitivity curves, therefore responding to different wavelengths of light.

In some cases, the image sensor 130 may instead or additionally include masks that block or prevent a certain amount of light from reaching certain photodiodes, or portions of certain photodiodes. In some examples, a mask can be implemented to increase or decrease an associated photodiode's sensitivity to light. For example, a more opaque mask can be used to decrease a photodiode's sensitivity to light, and a less opaque mask (or no mask) can be used to increase a photodiode's sensitivity to light. Moreover, in some examples, masks can be used for phase detection autofocus (PDAF). Moreover, in some examples, a mask can include a filter, layer, film, material, and/or other element or property that can be applied to filter a certain amount of light and prevent the filtered light from reaching an associated photodiode.

In some cases, the image sensor 130 can include a gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. In some examples, the image sensor 130 can include a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), and/or any other combination.

The image processor 150 may include one or more processors, such as one or more image signal processors (ISPs) 154, one or more processors 152, and/or one or more of any other type of processor discussed with respect to the computing device 700 described with respect to FIG. 7. The host processor 152 can be a digital signal processor (DSP) and/or other type of processor. In some implementations, the image processor 150 can include or be implemented by an integrated circuit or chip (e.g., referred to as a system-on-chip or SoC) that includes the processor 152 and the image signal processor 154. In some cases, the chip can also include one or more input/output ports (e.g., input/output (I/O) ports 156), central processing units (CPUs), graphics processing units (GPUs), modems (e.g., 3G, 4G or LTE, 5G, etc.), memory, connectivity components (e.g., Bluetooth™, Global Positioning System (GPS), etc.), and/or other components and/or combination thereof.

The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB), any combination thereof, and/or other input/output port. In one illustrative example, the processor 152 can communicate with the image sensor 130 using an I2C port, and the image signal processor 154 can communicate with the image sensor 130 using a MIPI port.

The image processor 150 may perform a number of tasks such as, for example, de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, image processing, image enhancement, computer vision, illumination, receipt of inputs, managing outputs, managing memory, HDR processing, and/or any combination thereof. The image processor 150 may store image frames and/or processed images in memory 140 (e.g., random access memory (RAM), read-only memory (ROM), etc.), a cache, another storage device, and/or any other memory or storage component.

One or more input/output (I/O) devices 160 may be connected to the image processor 150. The I/O devices 160 can include a display screen, a keyboard, a keypad, a touchscreen, a trackpad, a touch-sensitive surface, a printer, and/or any other output devices, any other input devices, a communication interface, a peripheral device, and/or any combination thereof.

In some cases, the image capture and processing system 100 may be part of or may be implemented by a single device. In other cases, the image capture and processing system 100 may part of or may be implemented by two or more separate devices. In the example shown in FIG. 1, the image capture and processing system 100 includes an image capture device 105A (e.g., a camera device) and an image processing device 105B. In some examples, the image capture device 105A and the image processing device 105B can be part of or implemented by a same system or device. In other examples, the image capture device 105A and the image processing device 105B can be part of or implemented by separate systems or devices. For example, in some implementations, the image capture device 105A can include a camera device and the image processing device 105B can include a computing device, such as a mobile handset, a laptop computer, or other computing device.

In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

In the illustrative example shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the image signal processor 154 and the processor 152), the memory 140, and the I/O 160. In some cases, certain components illustrated in the image capture device 105A, such as the image signal processor 154 and/or the processor 152, may be included in the image capture device 105A or vice versa.

The image capture and processing system 100 can include an electronic device, such as a mobile or stationary telephone (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, an Internet-of-Things (IoT) thing, a smart wearable device (e.g., a smart watch, smart glasses, a head mounted display (HMD), etc.), and/or any other suitable electronic device. In some examples, the image capture and processing system 100 can include one or more wireless transceivers for wireless communications, such as cellular network communications, 802.11 WIFI communications, and/or any other wireless communications.

While the image capture and processing system 100 is shown to include certain components, one of ordinary skill will appreciate that the image capture and processing system 100 can include other components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2A:
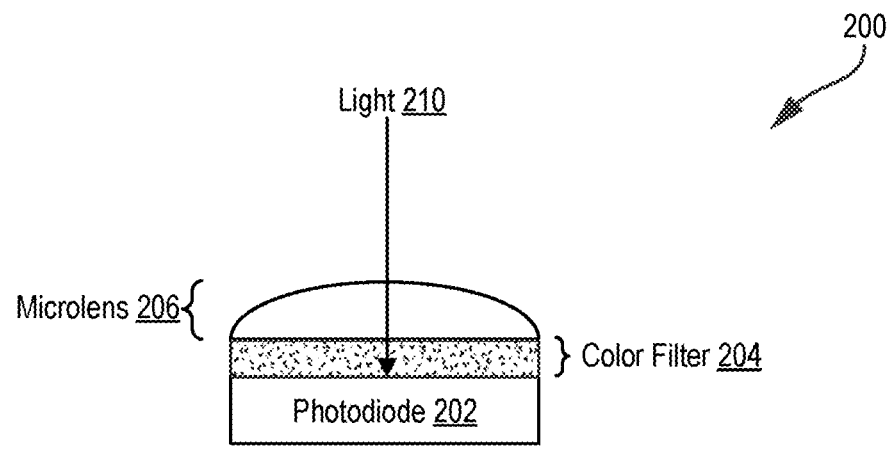
FIG. 2A illustrates a side view of an example photosensor pixel of a photosensor pixel array in an image sensor, in accordance with some examples of the present disclosure.

FIG. 2A illustrates a side view of an example photosensor pixel of a photosensor pixel array in an image sensor (e.g., 130). A photosensor pixel can include a photodiode/photodetector implemented by an image sensor to capture photons and associated pixel values. In this example, the photosensor pixel 200 includes a microlens 206 over a color filter 204 (e.g., a Bayer filter or other type of color filter as discussed below), and a photodiode 202. Light 210 can pass through the microlens 206 and the color filter 204 before reaching the photodiode 202.

The color filter 204 can represent a filter for a particular color, such as red, blue, or green, used to reflect a certain amount of that color. Red, green, and blue color filters are often used in image sensors and often referred to as Bayer filters. Bayer filter arrays often include more green Bayer filters than red or blue Bayer filters, for example in a proportion of 50% green, 25% red, 25% blue, to mimic sensitivity to green light in human eye physiology. Some color filter arrays (CFAs) can use alternate color schemes and can even include more or fewer colors. For example, some CFAs can use cyan, yellow, and magenta color filters instead of a red, green, and blue Bayer color filter scheme. In some cases, color filters of one or more colors in a color scheme may be omitted, leaving only two colors or even one color.

Moreover, in some cases, one or more photosensor pixels or an entire photosensor pixel array may lack color filters so the sensitivity to colors of the photosensor pixels or the entire photosensor pixel array is not reduced. For example, in some cases, the photosensor pixel 200 may include the microlens 206 and the photodiode 202 without the color filter 204.

Figure 2B:
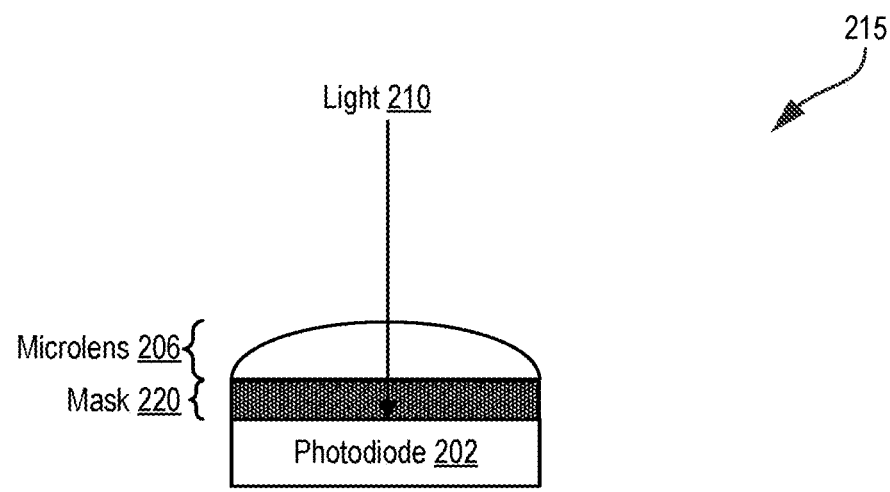
FIGS. 2B and 2C illustrate a side view of example sensitivity-biased photosensor pixels, in accordance with some examples of the present disclosure.
Figure 2C:
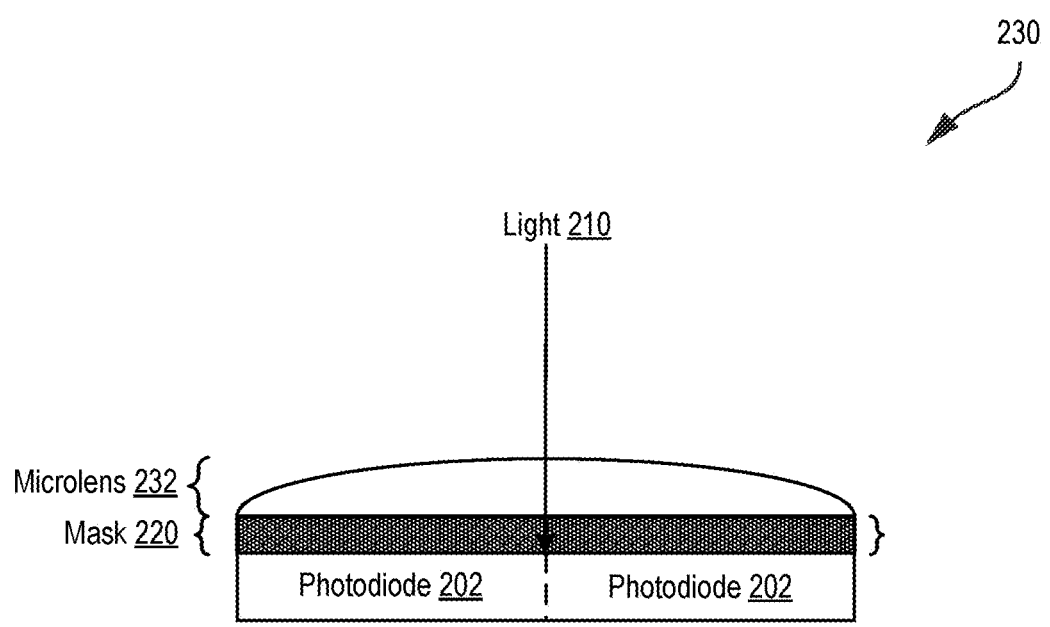

FIG. 2B illustrates a side view of an example sensitivity-biased photosensor pixel 215. In this example, the photosensor pixel 215 includes the microlens 206 and a mask 220 covering a photodiode 202 to reduce a light sensitivity of the photodiode 202. Light 210 can pass through the microlens 206 and the mask 220 before reaching the photodiode 202. The mask 220 can be configured to filter a certain amount of the light 210 to reduce the amount of the light 210 that reaches the photodiode 202 and thereby decrease the light sensitivity of the photodiode 202.

For example, to prevent a pixel from becoming oversaturated in a bright scene, the mask 220 can block or filter a certain amount of light in the scene from reaching the photodiode 202. The mask 220 can thus reduce the sensitivity to light of the photodiode 202 to allow the photodiode 202 to better capture brightness levels in the bright scene. As further described herein, the brightness levels captured by the photodiode 202 based on the light passing through the mask 220 can be used to calculate pixel values, and/or a normalization value for calculating pixel values, for oversaturated pixels measured by photodiodes in the image sensor, including other photodiodes in the image sensor that may not include a mask for filtering light in the scene. The pixel values calculated for the image captured by the photodiode array can be used to adjust exposure levels, improve convergence, render a scene with brightness levels that exceed a dynamic range of the photodiode array without clipping and/or needing multiple exposures, improve a performance of a subsequent image processing algorithm(s), etc.

In some cases, a photosensor pixel array can implement multiple photosensor pixels having a mask, such as photosensor pixel 215. In some examples, photosensor pixels having a mask can be implemented in one or more regions of a photosensor pixel array. For example, photosensor pixels with masks can be scattered across the photosensor pixel array. In other examples, photosensor pixels with masks can be implemented in one or more borders of the photosensor pixel array.

To illustrate, in some cases, photosensor pixels with masks can be implemented on a top and/or bottom border of the photosensor pixel array and/or on a left and/or right border of the photosensor pixel array. A camera system typically reads pixels on a line-by-line basis. Accordingly, in some examples, by placing photosensor pixels with masks on the borders of the photosensor pixel array, the camera system can quickly recognize the pixels from the photosensor pixels with masks as they are read and use them as further described herein to calculate pixel values for the image, rather than performing more expensive computations to detect or index such pixels if the photosensor pixels with masks are otherwise scattered throughout the image or mixed with other pixels from photosensor pixels that do not have a mask.

The amount of light that the mask 220 is configured to filter can vary in different implementations. For example, in some cases, the mask 220 can be configured to block more light (e.g., via increased darkening or using a material with higher light filtering capabilities) in order to further reduce the light sensitivity of the photodiode 202. This can allow the photodiode 202 to better capture brightness levels in brighter scenes. In other cases, the mask 220 can be configured to block less light to limit how much the light sensitivity of the photodiode 202 is reduced. In yet other cases, the photosensor pixel may not include a mask so the light sensitivity of the photodiode 202 is not reduced.

In some implementations, to increase the light sensitivity of the photodiode 202 and better capture brightness levels in darker scenes, the aperture of the photosensor pixel can be increased. For example, with reference to FIG. 2C, a photosensor pixel 230 can include multiple photodiodes 202 (or a single, larger photodiode) and a larger microlens 232 extended over the multiple photodiodes 202 (or the single, larger photodiode). This configuration can allow the photosensor pixel 230 to capture more of the light 210 and thereby increase the light sensitivity of the photosensor pixel 230. With a higher light sensitivity, the photosensor pixel 230 may better capture brightness levels in a darker scene.

The photosensor pixel 230 can optionally include a mask 220 to filter a certain amount of light. For example, in some cases, the photosensor pixel 230 may not include a mask to avoid reducing the light sensitivity of the photosensor pixel 230. In other cases, the photosensor pixel 230 can include a larger mask that covers the multiple photodiodes 202 to block a certain amount of light and reduce the light sensitivity of the photosensor pixel 230 by a certain amount.

While the photosensor pixels 215 and 230 are shown in FIGS. 2B and 2C without a color filter, it should be understood that in some examples, the photosensor pixels 215 and/or 230 can include a color filter as previously described with respect to FIG. 2A. Moreover, it should be understood that photosensor pixels in photosensor pixel arrays can have other apertures and/or mask configurations than those shown in FIGS. 2A through 2C. For example, FIGS. 3A through 4 illustrate various example configurations of photosensor pixel arrays that can be implemented to increase and/or reduce the light sensitivity of one or more photosensor pixels in an image sensor.

Figure 3A:
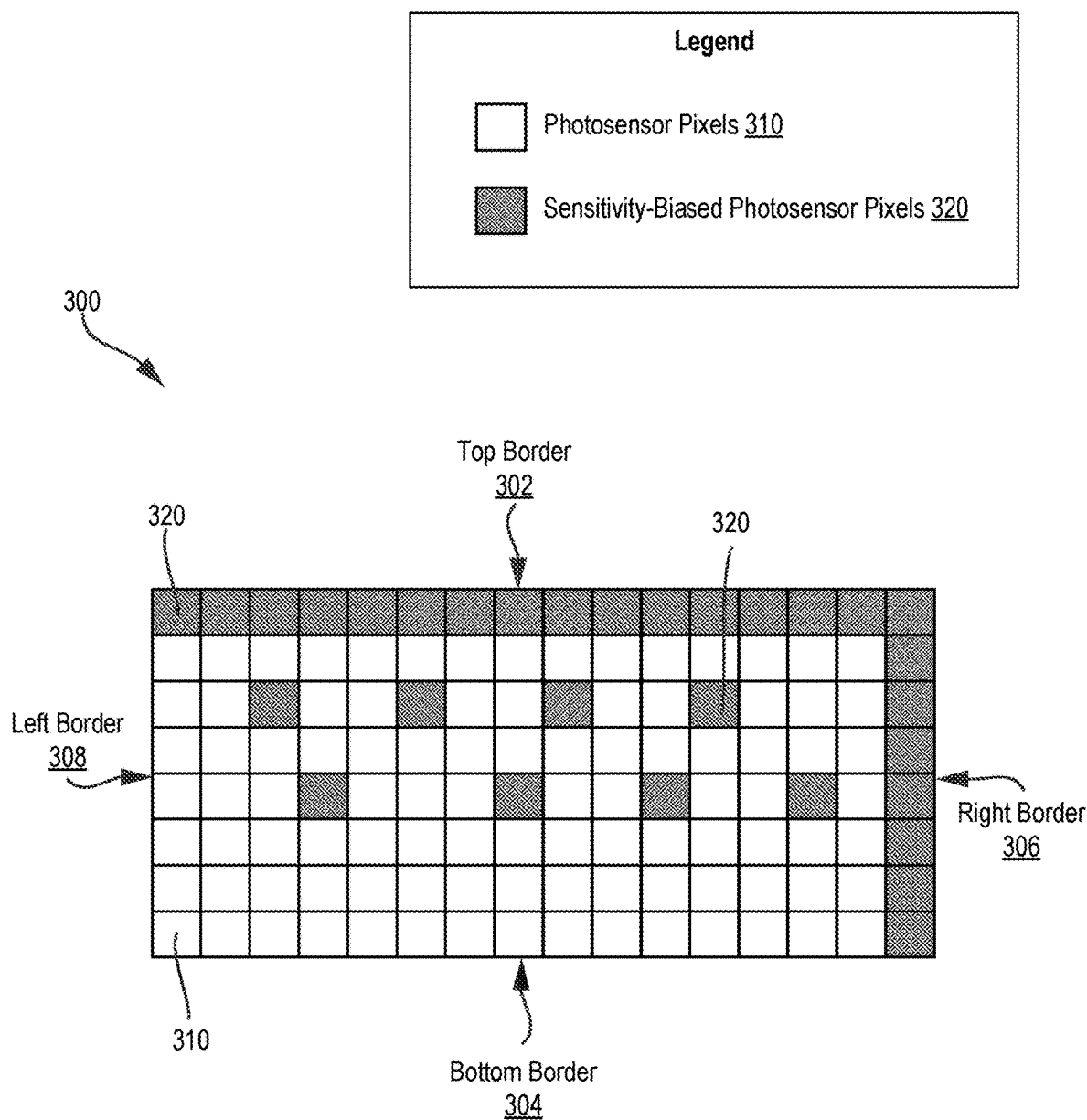
FIGS. 3A through 3E are block diagrams illustrating example configurations of a photosensor pixel array including photosensor pixels and sensitivity-biased photosensor pixels, in accordance with some examples of the present disclosure.

FIG. 3A is a diagram illustrating an example configuration of a photosensor pixel array 300 including photosensor pixels 310 (shown with a white color) and sensitivity-biased photosensor (SBP) pixels 320 (shown with a gray color). The photosensor pixels 310 do not include a mask for filtering light, such as mask 220, but may or may not include color filters, such as color filter 204. The SBP pixels 320 can include masks for filtering a certain amount of light and thereby reducing the light sensitivity of photodiodes in the SBP pixels 320, as previously described.

In some examples, the photosensor pixel array 300 can include SBP pixels 320 on a top border 302 of the photosensor pixel array 300, a bottom border 304 of the photosensor pixel array 300, a right border 306 of the photosensor pixel array 300, and/or a left border 308 of the photosensor pixel array 300. Parts of the photosensor pixel array outside of the top border 302, the bottom border 304, the right border 306, and the left border 308 can be referred to as non-border regions of the photosensor pixel array 300. In the example shown in FIG. 3A, the photosensor pixel array 300 includes SBP pixels 320 on the top border 302 and the right border 306 of the photosensor pixel array 300.

In some examples, the SBP pixels 320 can be used to determine more accurate pixel values for an undersaturated/underexposed and/or oversaturated/overexposed image captured by photodiodes in the photosensor pixel array. For example, the SBP pixels 320 can measure unsaturated pixel values in an oversaturated/overexposed image and can be used to calculate more accurate pixel values that otherwise exceed the dynamic range of the image sensor. Even if the SBP pixels 320 are also saturated, the SBP pixels 320 can still lead to more accurate predictions. For example, assume the SBP pixels 320 in this illustrative example are 10×less sensitive to light than the photosensor pixels 310 and a scene change causes all photosensor pixels to saturate, including both the photosensor pixels 310 and the SBP pixels 320. The fact that the SBP pixels 320 are 10× less sensitive than the photosensor pixels 310 and are nevertheless saturated means that reducing the exposure of the photosensor pixels 310 (which are not sensitivity biased) by 10× will not provide a sufficient or large enough adjustment. In this example, the fact that the SBP pixels 320 are 10× less sensitive to light and yet are still saturated indicates that the exposure of the photosensor pixels 310 should be decreased by even more than 10×. Thus, the SBP pixels 320 can be used to make the determination that the exposure of the photosensor pixels 310 should be decreased by more than 10×, and would consequently lead to a more accurate prediction than would be possible if the photosensor pixel array 300 did not include SBP pixels 320 as the photosensor pixels 310 without the SBP pixels 310 would not provide sufficient information to conclude that the exposure should be reduced by more than 10×.

In some cases, the more accurate pixel values can be used to calculate an adjustment factor. In some examples, the adjustment factor can be used to determine and/or implement an adjusted (e.g., a more correct/accurate) exposure for a scene captured by the photosensor pixel array 300. In some examples, the adjustment factor can be used to correct the undersaturated/oversaturated and/or oversaturated/overexposed pixel values. In some examples, the adjustment factor can be used to adjust the exposure for a scene and also to correct undersaturated/oversaturated and/or oversaturated/overexposed pixel values.

In some examples, the more accurate pixel values and/or the calculated adjustment factor can be used to converge exposures when a scene abruptly changes from bright to dark or from dark to bright. For example, when the brightness levels of a scene abruptly increase to a level such that captured pixel values become oversaturated and/or appear white, the adjustment factor can be used to normalize or adjust the exposure and/or oversaturated pixel values to certain brightness levels that can allow the scene to be rendered and/or exposure convergence time to be reduced by an Image Capture and Processing System (e.g., the system 100).

As previously noted, the sensitivity of the SBP pixels 320 can vary in different examples to better capture brightness levels in a darker scene and/or a brighter scene. For example, an SBP pixel 320 can be made more sensitive to light by increasing its aperture, configuring the SBP pixel 320 without any masks, and/or increasing the rate for converting photons to electrical charges. Moreover, in some examples, an SBP pixel 320 can be made less sensitive to light by applying a mask that blocks a certain amount of light on the SBP pixel 320, reducing its aperture, and/or decreasing the rate for converting photons to electrical charges. In an illustrative example involving a bright scene, the SBP pixels 320 can implement a mask to block a certain amount of light. Thus, while photosensor pixels 310, which do not include a mask, may become oversaturated/overexposed by the light in the brighter scene, the less sensitive SBP pixels 320 may filter a certain amount of the light and provide a lower pixel value that is not oversaturated/overexposed.

In some cases, to calculate the accurate pixel values for the less sensitive SBP pixels 320, the pixel values captured by the less sensitive SBP pixels 320 can be multiplied by the amount of filtering provided by such SBP pixels 320. For example, if an SBP pixel 320 is configured to capture half of the light it receives and filter the other half of the light, and the SBP pixel 320 captures a pixel value of 500, then the pixel value of 500 can be multiplied by 2 (which corresponds to the SBP pixels light sensitivity being reduced by ½ in this example) to estimate an actual pixel value of 1000. In some examples, the pixel value of 1000 can be used to infer the actual pixel value and/or adjust the captured pixel values, of pixels captured by the other photosensor pixels 310 in the photosensor pixel array 300. Moreover, the pixel value of 1000 can be used to calculate an adjustment factor for adjusting exposure settings of the image sensor.

For example, in some cases, to determine an adjustment factor for adjusting exposure settings, a target exposure value can be selected and divided by the pixel value calculated using the SBP pixels 320 (e.g., 1000 in the previous example). To illustrate, in the previous example, if the target exposure value is 50, the target exposure value of 50 can be divided by the actual pixel value 1000 calculated using the SBP pixels 320, to yield an adjustment factor of 0.05. The adjustment factor of 0.05 can then be used to adjust the exposure settings and/or correct the pixel values for saturated pixels.

Moreover, by implementing SBP pixels 320 in border regions (e.g., 302, 304, 306, 308) of the photosensor pixel array 300, the SBP pixels 320 can be detected more efficiently and/or with less expensive computations. For example, camera systems typically read pixel values measured by a photosensor pixel array on a line-by-line basis. Accordingly, in some examples, by placing SBP pixels 320 on the border region(s) of the photosensor pixel array 300, a camera system can quickly recognize the pixel values measured by the SBP pixels 320 in the border regions based on a difference in brightness levels between the pixel values from the SBP pixels 320 and other pixel values, a location of the SBP pixels 320, a line in a pixel value stream, and/or a difference between pixel values in lines corresponding to border regions and pixel values corresponding to other photosensor pixels. This way, the camera system can detect the pixels corresponding to the SBP pixels 320 in the border regions without performing more expensive computations that may otherwise be needed to detect pixel values from SBP pixels 320 located in other regions of the photosensor pixel array 300. In some cases, the camera system can place pixel values recognized as corresponding to the SBP pixels 320 in a buffer or storage for use as described herein.

In some examples, the photosensor pixel array 300 can include one or more SBP pixels 320 in other regions of the photosensor pixel array 300. For example, the photosensor pixel array 300 can include one or more SBP pixels 320 scattered at inner or non-border regions of the photosensor pixel array 300. In some examples, the SBP pixels 320 on the other regions (e.g., the inner or non-border regions) of the photosensor pixel array 300 can be used for PDAF. In other examples, such SBP pixels 320 can be used to determine more accurate pixel values as described herein. In some cases, as previously described, the more accurate pixel values can be used to calculate an adjustment factor to determine and/or implement an adjusted exposure for a scene captured by the photosensor pixel array 300 and/or correct oversaturated pixel values.

Figure 3B:
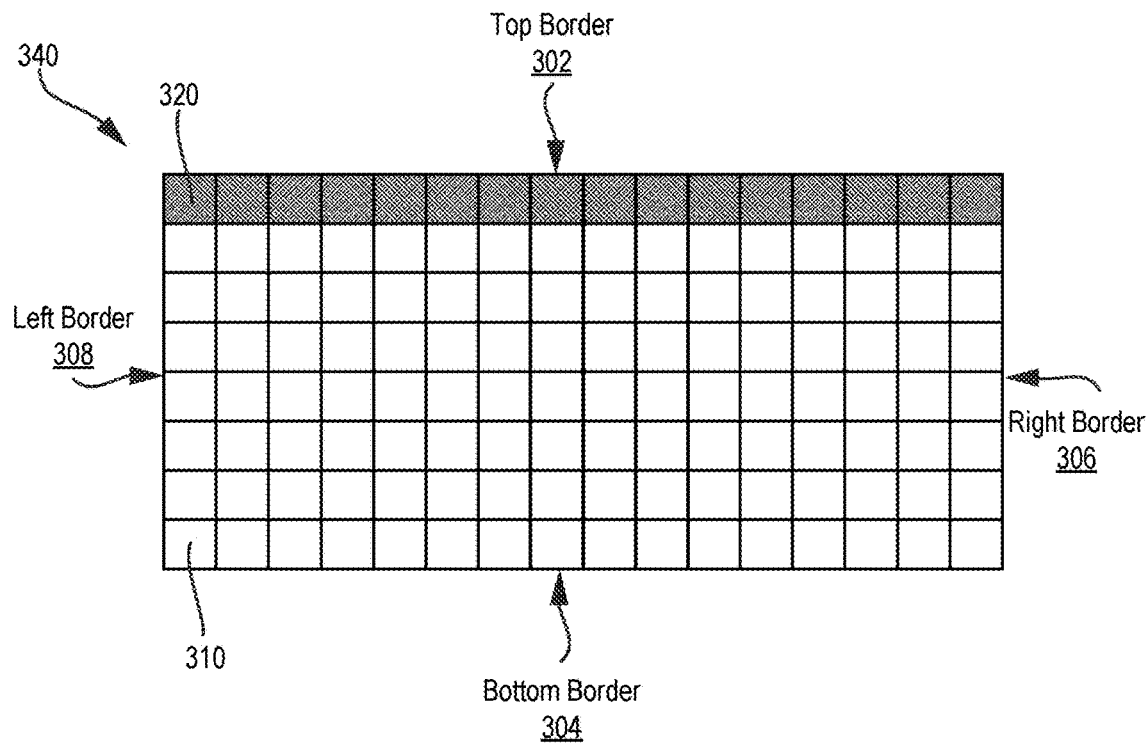

FIG. 3B is a block diagram illustrating another configuration of a photosensor pixel array 340 having SBP pixels 320. In this example, the SBP pixels 320 are configured across the top border 302 of the photosensor pixel array 340, and remaining regions of the photosensor pixel array 340, including the bottom border 304, the right border 306, and the left border 308, are configured with photosensor pixels 310 that are not sensitivity-biased (e.g., that do not include masks). In some cases, since pixel values can be read by a camera system on a line-by-line basis, the pixel values from the SBP pixels 320 across the top border 302 can be detected as the lines and/or the pixel values corresponding to the top border 302 (and/or the line associated with the top border 302) are read by the camera system. In some examples, the camera system can detect the pixel values from the SBP pixels 320 based on a difference between the pixel values associated with the top border 302 (and/or the line associated with the top border 302) and the pixel values corresponding to one or more other regions in the photosensor pixel array 340 (and/or other lines in the image).

Figure 3C:
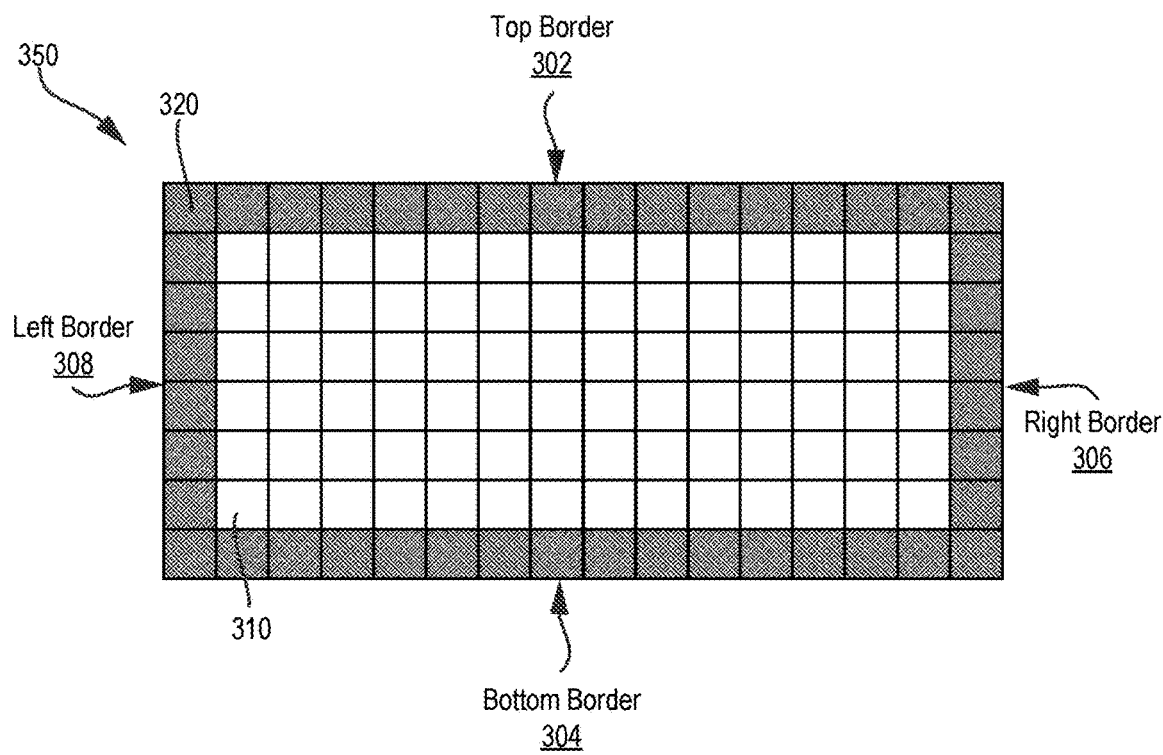

FIG. 3C is a block diagram illustrating another configuration of a photosensor pixel array 350 having SBP pixels 320. In this example, the SBP pixels 320 are configured across the top border 302, the bottom border 304, the right border 306, and the left border 308 of the photosensor pixel array 340. In other words, SBP pixels 320 are placed on all borders of the photosensor pixel array 350. The remaining regions of the photosensor pixel array 350 are configured with photosensor pixels 310 that are not sensitivity-biased (e.g., that do not include masks). In some cases, since pixel values can be read by a camera system on a line-by-line basis, the pixel values from the SBP pixels 320 across the borders 302, 304, 306, and 308 can be detected as the lines and/or pixel values corresponding to the borders (and/or the lines associated with the borders) are read by the camera system, and/or based on a difference between the pixel values associated with the borders (and/or the lines associated with the borders) and the pixel values corresponding to one or more other regions in the photosensor pixel array 340 (and/or other lines in the image).

Figure 3D:
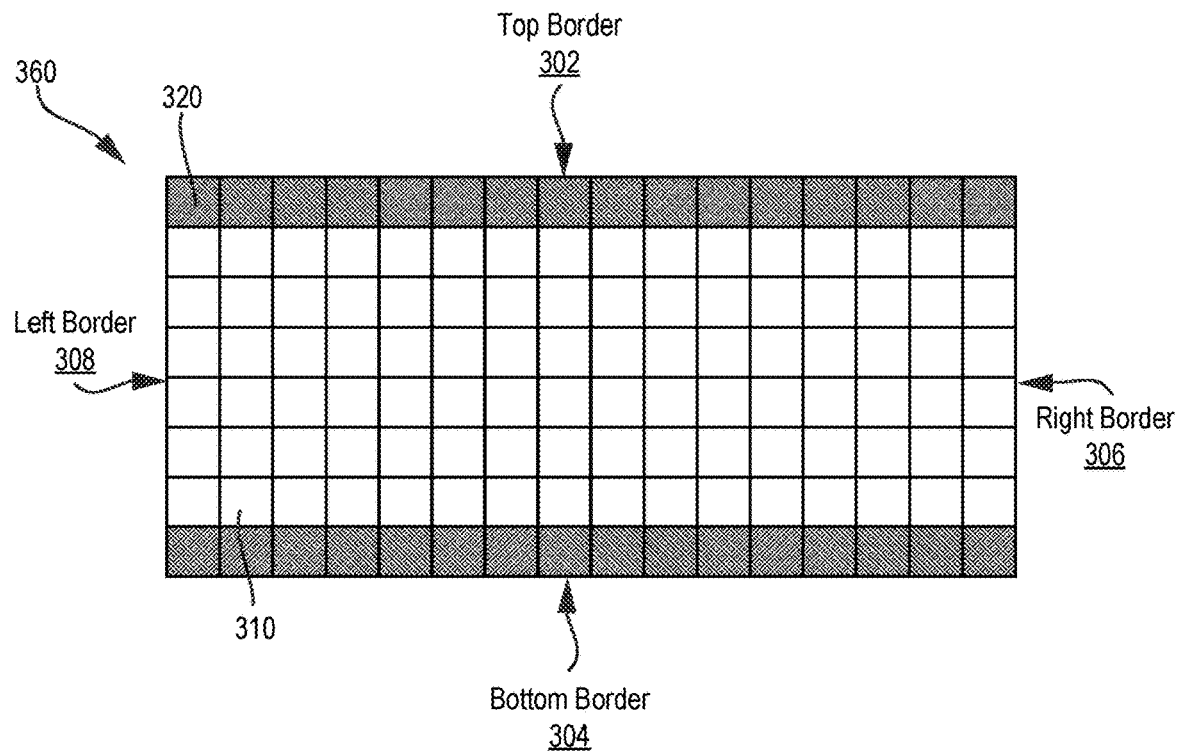

FIG. 3D is a block diagram illustrating another configuration of a photosensor pixel array 360 having SBP pixels 320. In this example, the SBP pixels 320 are configured across the top border 302 and the bottom border 304 of the photosensor pixel array 340, and remaining regions of the photosensor pixel array 340, including the right border 306 and the left border 308, are configured with photosensor pixels 310 that are not sensitivity-biased (e.g., that do not include masks). Since pixel values can be read by a camera system on a line-by-line basis, the pixels from the SBP pixels 320 across the top border 302 and the bottom border 304 can be easily detected when the lines and/or the pixel values corresponding to the top border 302 and the bottom border 304 (and/or the lines associated with the top border 302 and the bottom border 304) are read by the camera system, and/or based on a difference between the pixel values associated with the top border 302 and the bottom border 304 (and/or the lines associated with the top border 302 and the bottom border 304) and the pixel values corresponding to one or more other regions in the photosensor pixel array 340 (and/or other lines in the image).

Figure 3E:
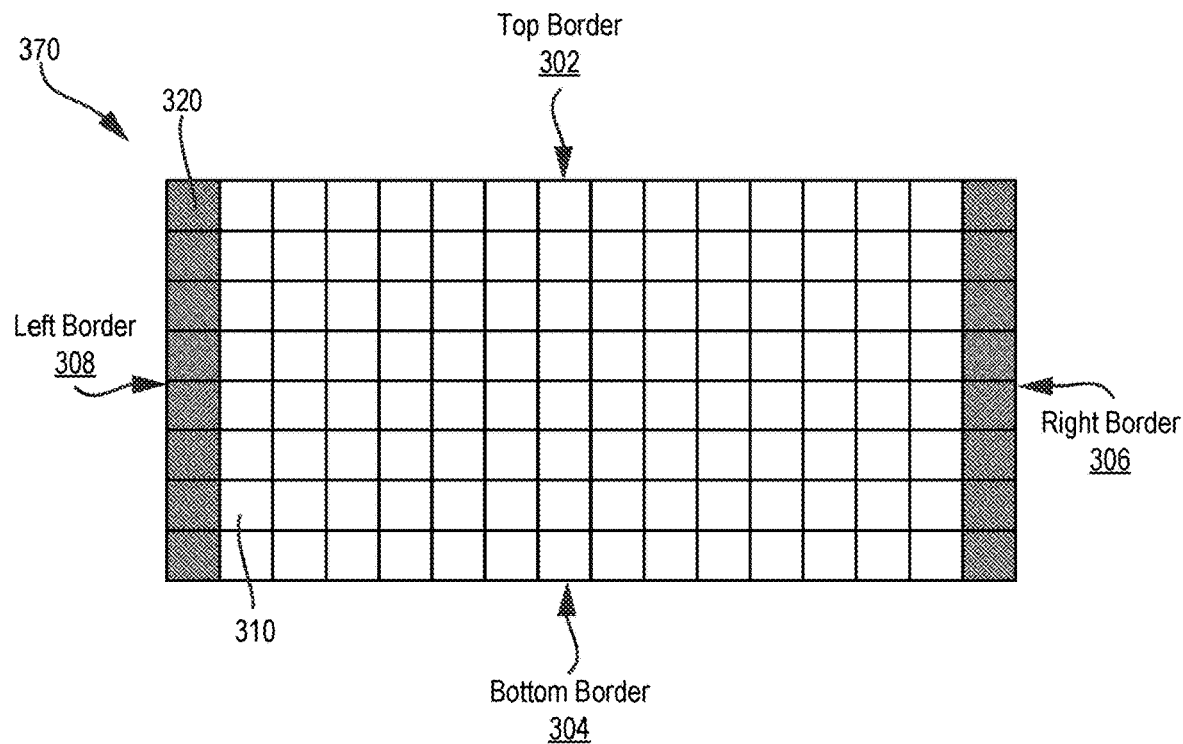

FIG. 3E is a block diagram illustrating another configuration of a photosensor pixel array 370 having SBP pixels 320. In this example, the SBP pixels 320 are configured across the right border 306 and the left border 308 of the photosensor pixel array 370, and remaining regions of the photosensor pixel array 370, including the top border 302 and the bottom border 304, are configured with photosensor pixels 310 that are not sensitivity-biased (e.g., that do not include masks). Since pixel values can be read by a camera system on a line-by-line basis, the pixel values from the SBP pixels 320 across the right border 306 and the left border 308 can be easily detected when the lines and/or pixel values corresponding to the right border 306 and the left border 308 (and/or the lines associated with the right border 306 and the left border 308) are read by the camera system, and/or based on a difference between the pixel values associated with the right border 306 and the left border 308 (and/or the lines associated with the right border 306 and the left border 308) and the pixel values corresponding to one or more other regions in the photosensor pixel array 370 (and/or other lines in the image).

While the photosensor pixels 310 and the SBP pixels 320 in FIGS. 3A through 3E are shown to have a same size and shape, it should be noted that, in other examples, the size and/or shape of photosensor pixels 310 and/or SBP pixels 320 in a same photosensor pixel array can vary. For example, in some cases, the SBP pixels 320 can have a different size and/or shape than the photosensor pixels 310 in the same photosensor pixel array. Moreover, in some cases, the size and/or shape of some SBP pixels 320 can be different than the size and/or shape of other SBP pixels 320 in the same photosensor pixel array.

FIG. 4 illustrates various example configurations of photosensor pixels. Here, the photosensor pixels 310 represent a photosensor pixel that is not sensitivity biased. The photosensor pixels 310 do not have a mask to filter a certain amount of light and do not have an adjusted aperture to allow the photosensor pixels 310 to capture more light and thereby increased the light sensitivity of the photosensor pixels 310. On the other hand, the SBP pixels 320A-H have different mask and/or aperture configurations.

In this example, SBP pixels 320A-F have a same aperture as the photosensor pixels 310 but include a different mask patterns configured to block different amounts and/or patterns of light. For example, the SBP pixels 320A have a solid mask covering their associated photodiodes, and the SBP pixels 320B have a patterned mask covering their associated photodiodes. The SBP pixels 320C have a mask covering a right portion of their associated photodiodes but have a left portion 402 of their associated photodiodes unmasked or uncovered by a mask. Similarly, the SBP pixels 320D have a mask covering a top portion of their associated photodiodes but have a bottom portion 404 of their associated photodiodes unmasked or uncovered by a mask. On the other hand, the SBP pixels 320E have a mask covering a portion of their associated photodiodes but leaving an inner region 406 (e.g., a center region) of their associated photodiodes uncovered.

Like the SBP pixels 320A, the SBP pixels 320F have a same aperture as the photosensor pixels 310 and a solid mask covering their associated photodiodes. However, the solid mask in the SBP pixels 320F is darker than the solid mask in the SBP pixels 320A and can filter more light. Thus, the SBP pixels 320F are less sensitive to light than the SBP pixels 320A.

Moreover, like the SBP pixels 320A, the SBP pixels 320G have a solid mask covering their associated photodiodes, but otherwise have a different aperture than the SBP pixels 320A. Thus, the SBP pixels 320G may capture more light than the SBP pixels 320A and may be more sensitive to light than the SBP pixels 320A. Accordingly, the SBP pixels 320G may better capture brightness levels in darker scenes than the SBP pixels 320A.

Like the photosensor pixels 310, the SBP pixels 320H do not have a mask covering their associated photodiodes. However, the SBP pixels 320H have a larger aperture than the photosensor pixels 310. Thus, the SBP pixels 320H may capture more light than the photosensor pixels 310 and may be more sensitive to light than the photosensor pixels 310. Accordingly, the SBP pixels 320H may better capture brightness levels in darker scenes than the photosensor pixels 310.

As illustrated above, the size of an SBP pixel and/or the mask (and characteristics thereof) implemented for an SBP pixel can be used to change, tailor, and/or influence the light sensitivity of the SBP pixel. However, other strategies for changing, tailoring, and/or influencing the light sensitivity of an SBP pixel are also contemplated herein. For example, in some cases, the light sensitivity of an SBP pixel can be reduced to calculate pixel values and/or saturation levels in bright scenes (e.g., when pixel values are saturated) by reducing the rate or amount in which photons received by the SBP pixel are converted to electrical charges. Similarly, the light sensitivity of an SBP pixel can be increased to calculate pixel values in dark scenes (e.g., when pixel values are undersaturated) by increasing the rate or amount in which photons received by the SBP pixel are converted to electrical charges.

The various configurations of SBP pixels shown in FIG. 4 are merely illustrative examples provided for explanation purposes. One of skill in the art will recognize that other SBP pixel configurations, such as other shapes, sizes, masks, mask patterns, etc., can be used to change, tailor, and/or influence the light sensitivity of SBP pixels.

Figure 5:
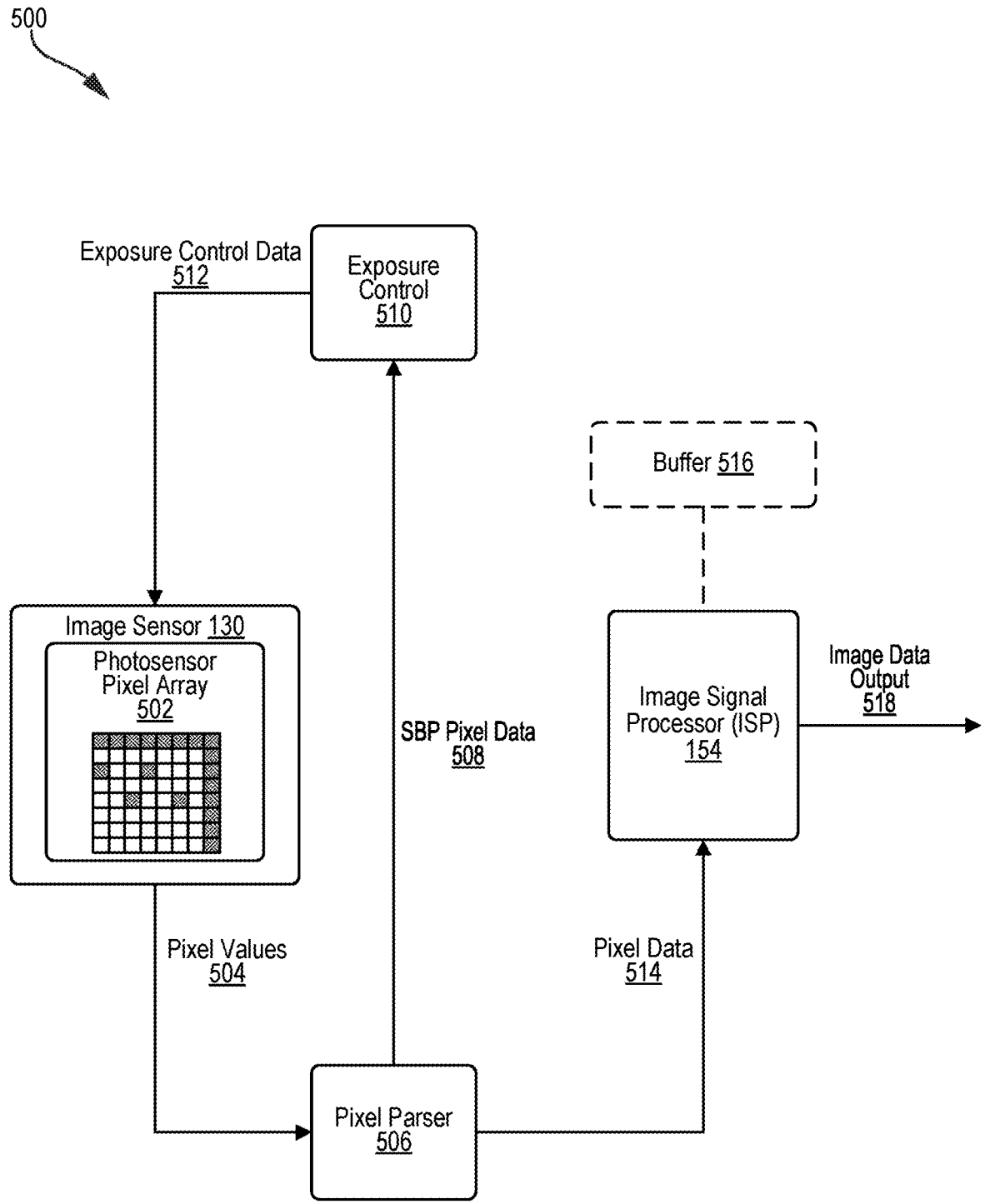
FIG. 5 is a diagram illustrating a system flow for exposure control using sensitivity-biased photosensor pixels, in accordance with some examples of the present disclosure.

FIG. 5 is a diagram illustrating a system flow 500 for exposure control using SBP pixels. As illustrated, the image sensor 130 includes a photosensor pixel array 502, such as any of the photosensor pixel arrays previously described. The photosensor pixel array 502 includes photosensor pixels (e.g., 200, 310) and SBP pixels (e.g., 215, 230, 320). The SBP pixels in the photosensor pixel array 502 can include photosensor pixels with reduced light sensitivity and/or photosensor pixels with increased light sensitivity. Moreover, the photosensor pixel array 502 can include one or more SBP pixels at one or more border locations and/or one or more inner locations.

The image sensor 130 can generate pixel values 504 corresponding to an image of a scene captured by the image sensor 130. The pixel values 504 can include pixel values and/or a stream of image pixel values calculated/measured by the photosensor pixel array 502. The pixel values 504 can include one or more pixel values calculated/measured by photosensor pixels that are not sensitivity biased and one or more pixel values calculated/measured by SBP pixels.

In some cases, if the scene is bright, the pixel values from the photosensor pixels that are not sensitivity biased may be oversaturated/overexposed (e.g., white or overly white) and/or may exceed a maximum saturation value that the image sensor 130 can calculate/measure. However, the photosensor pixel array 502 can include one or more SBP pixels that have a reduced light sensitivity. Since the one or more SBP pixels have a reduced light sensitivity, the one or more SBP pixels may be able to calculate/measure pixel values that are not saturated and/or that do not exceed the maximum saturation/ exposure value associated with the image sensor 130. In other words, with the lower light sensitivity of the one or more SBP pixels, the pixel values from the one or more SBP pixels may have lower brightness levels and may not be oversaturated/overexposed. As previously explained, even if the SBP pixels are also saturated, the SBP pixels can provide additional information that would allow for more accurate predictions. For example, if the light sensitivity of the SBP pixels is reduced by a X amount and a scene change still causes the SBP pixels to saturated, the fact that the SBP pixels are saturated would indicate that the exposure of the normal photosensor pixels (e.g., the photosensor pixels that are not sensitivity biased) should be reduced by more than X amount (e.g., the amount corresponding to how much the light sensitivity of the SBP pixels has been reduced).

The pixel values from the one or more SBP pixels can be used to estimate actual pixel values for the image, including pixel values that would otherwise exceed the maximum saturation/exposure value associated with the image sensor 130, in order to more accurately and efficiently calculate and adjust exposure settings of the image sensor 130 and improve exposure convergence as further described herein. In some examples, the pixel values from the one or more SBP pixels can be used to adjust and/or correct the pixel values from the photosensor pixels that are not sensitivity biased.

On the other hand, in some cases, if the scene is dark, the pixel values from the photosensor pixels that are not sensitivity biased may be undersaturated/underexposed (e.g., black or overly dark). However, the photosensor pixel array 502 can include one or more SBP pixels that have an increased light sensitivity and thus can measure pixel values that are not undersaturated/underexposed, that have increased brightness levels, and/or that better capture light in the dark scene. Such pixel values from the SBP pixels can be used to estimate actual pixel values for the image, including pixel values that are not undersaturated/underexposed, in order to more accurately and efficiently calculate and adjust exposure settings of the image sensor 130 and improve exposure convergence as further described herein. In some examples, the pixel values from the one or more SBP pixels can be used to adjust and/or correct the pixel values from the photosensor pixels that are not sensitivity biased.

The image sensor 130 can provide the pixel values 504 to pixel parser 506. In some examples, the pixel parser 506 can be part of or implemented by the image sensor 130. In some examples, the pixel parser 506 and the image sensor 130 can be part of or implemented by a same device, such as the image capture device 105A or the image capture and processing system 100. In other examples, the pixel parser 506 can be part of or implemented by a different device or component than the image sensor 130. For example, in some cases, the pixel parser 506 can be implemented by the image processor 150 or a separate device from the image capture and processing system 100.

The pixel parser 506 can parse the pixel values 504 and identify pixel values from SBP pixels in the photosensor pixel array 502. For example, the pixel parser 506 can parse the pixel values 504 to identify pixel values that are not saturated (e.g., undersaturated and/or oversaturated) and/or that have different brightness levels than other pixel values that are saturated. In some examples, the pixel parser 506 can identify pixel values from SBP pixels based on a difference between pixel values in the pixel values 504. For example, as previously explained, if the scene is bright, the pixel values from the photosensor pixels that are not sensitivity biased may be oversaturated and/or may exceed a maximum saturation value associated with the image sensor 130, but pixel values from SBP pixels with reduced light sensitivity may not be saturated (e.g., oversaturated) and/or may not exceed a maximum saturation value associated with the image sensor 130. Thus, in some cases, the pixel parser 506 may distinguish between the pixel values from the photosensor pixels that are not sensitivity biased and the pixel values from SBP pixels with reduced light sensitivity based on a difference in their saturation/brightness levels and/or pixel values.

If the scene is instead dark, the pixel values from the photosensor pixels that are not sensitivity biased may be undersaturated, but pixel values from SBP pixels with increased light sensitivity may not be undersaturated, may have higher brightness levels, and/or may better capture light intensities. Thus, in some cases, the pixel parser 506 may distinguish between the pixel values from the photosensor pixels that are not sensitivity biased and the pixel values from SBP pixels with increased light sensitivity based on a difference in their saturation/brightness levels and/or pixel values.

In some examples, the pixel parser 506 can read and/or receive the pixel values 504 on a line-by-line basis and detect pixel values from SBP pixels in a border of the photosensor pixel array 502 based on the location of a readout line within an image pixel array (e.g., readout in top row of image pixel array can correspond to SBP pixels in a top border of the photosensor pixel array, etc.), the location of the SBP pixels, the location of a readout line with a stream of pixel values, and/or a difference between pixel values in a readout line and pixel values in one or more other readout lines. For example, in some cases, the pixel parser 506 can detect pixel values from SBP pixels in a border of the photosensor pixel array 502 based on the readout line corresponding to the border location of the SBP pixels, a location of the SBP pixels relative to a location of other photosensor pixels, a sequence/order and/or location associated with a readout line, and/or a determination that a readout line corresponds to a border in an image array associated with the pixel values 504.

In some examples, the pixel parser 506 can detect a difference in saturation/brightness levels between the pixel values from the SBP pixels and other pixel values. For example, if the pixel parser 506 identifies oversaturated/ overexposed pixel values and pixel values that are not oversaturated/overexposed, the pixel parser 506 can determine that the pixel values that are not oversaturated/overexposed correspond to SBP pixels with a reduced light sensitivity. Similarly, if the pixel parser 506 identifies undersaturated/underexposed pixel values and pixel values that have higher brightness levels, the pixel parser 506 can determine that the pixel values that have higher brightness levels correspond to SBP pixels with an increased light sensitivity.

After parsing the pixel values 504, the pixel parser 506 can send SBP pixel data 508 to exposure control 510. In some examples, the exposure control 510 can be part of or implemented by the image sensor 130. However, in other examples, the exposure control 510 can be a control mechanism implemented by a different device, such as image signal processor 154, processor 152, image processor 150, image capture device 105A, image processing device 105B, or a separate device.

In some cases, after parsing the pixel values 504, the pixel parser 506 can also send pixel data 514 to the image signal processor 154. The pixel data 514 sent to the image signal processor 154 can include pixel values from the photosensor pixels that are not sensitivity biased. In some cases, the image signal processor 154 can use the pixel data 514 to generate an image data output 518. In some examples, the image data output 518 can be an image and/or image pixel array generated by the image signal processor 154.

In some cases, the pixel data 514 sent to the image signal processor 154 can also include pixel values measured by SBP pixels. For example, the pixel parser 506 can provide pixel values from the photosensor pixels that are not sensitivity biased to the image signal processor 154 and provide those pixel values to the image signal processor 154. In some cases, the pixel parser 506 or the image signal processor 154 can store pixel values measured by SBP pixels in a buffer 516. The buffer 516 can be part of or implemented by the image signal processor 154 or a separate device. In some cases, the image signal processor 154 can use the pixel values measured by SBP pixels to adjust brightness levels of the image data output 518. For example, if the image sensor 130 has a 10-bit limit and can only provide a maximum pixel value of 1023, the pixel values from the image sensor 130 will be saturated at 1023 and will not be able to capture higher brightness levels.

However, if a light sensitivity of an SBP pixel is reduced by half (e.g., if the SBP pixel is configured to capture half of the light it receives and filter the other half of the light), and the SBP pixel captures a pixel value of 600 in a scene, the image signal processor 154 can multiply the pixel value of 600 by 2 (which reflects the amount of light configured to be filtered from the light used to calculate the pixel value of 600) to generate an estimated pixel value of 1200 for the scene. The estimated pixel value of 1200 in this example can thus account for the sensitivity level (e.g., ½) of the SBP pixel. Since the image signal processor 154 may not have the 10-bit limit of the image sensor 130 and may be able to exceed the 1023 pixel value, the image signal processor 154 can use the 1200 estimated pixel value when generating the image data output 518. It should be noted that the pixel values, the 10-bit limit, and the light sensitivity in this example are merely illustrative examples provided for explanation purposes and other examples can include other pixel values, bit limits, and/or light sensitivities.

The SBP pixel data 508 sent by the pixel parser 506 to exposure control 510 can include pixel values identified to correspond to SBP pixels. For example, the SBP pixel data 508 can include pixel values that have lower brightness levels than other pixel values that are oversaturated/overexposed, and/or pixel values that have higher brightness levels than other pixel values that are undersaturated/underexposed. In some examples, in addition to including pixel values identified to correspond to SBP pixels, the SBP pixel data 508 can include one or more oversaturated/overexposed and/or undersaturated/underexposed pixel values from other photosensor pixels.

The exposure control 510 can use the SBP pixel data 508 to calculate exposure control data 512, and provide the exposure control data 512 to the image sensor 130. In some examples, the exposure control data 512 can include auto-exposure control settings for the image sensor 130, such as an exposure adjustment factor and/or exposure setting. In some examples, the exposure control 510 can use the SBP pixel data 508 to calculate an adjustment factor and/or exposure setting for the image sensor 130. In some cases, the image sensor 130 can be used for automatic exposure control during an exposure convergence.

In some examples, the exposure control 510 can adjust the pixel value of an SBP pixel based on the sensitivity level of the SBP pixel. For example, if a light sensitivity of an SBP pixel is reduced by half (e.g., if the SBP pixel is configured to capture half of the light it receives and filter the other half of the light), and the SBP pixel captures a pixel value of 500 in a scene, the exposure control 510 can multiply the pixel value of 500 by 2 to generate an estimated or actual pixel value of 1000 for the scene. The estimated or actual pixel value of 1000 in this example can be the adjusted SBP pixel value, which can account for the sensitivity level (e.g., ½) of the SBP pixel. Since the adjusted SBP pixel value can account for brightness levels that other photosensor pixels may not otherwise be able to capture, the adjusted SBP pixel value can provide a more accurate way to calculate exposure settings for the image sensor 130 than pixel values from other photosensor pixels.

In some cases, the exposure control 510 can then divide a target exposure value calculated for the image sensor 130 (and/or image pixel values captured by the image sensor 130) by the adjusted SBP pixel value (e.g., the pixel value of 1000 in the previous example) to determine an adjustment factor or exposure setting. For example, if the target value is 50, the exposure control 510 can divide the target value of 50 by the adjusted SBP pixel value of 1000 to yield an adjustment factor of 0.05. The exposure control 510 can provide the adjustment factor of 0.05 to the image sensor 130 for the image sensor 130 to use to adjust its exposure settings (e.g., exposure time, shutter speed, gain, etc.) and/or improve exposure convergence.

Having disclosed example systems, components and concepts, the disclosure now turns to the example method 600 for automatic exposure control using SBP pixels, as shown in FIG. 6. The steps outlined herein are non-limiting examples provided for illustration purposes, and can be implemented in any combination thereof, including combinations that exclude, add, or modify certain steps.

At block 602, the method 600 can include receiving a plurality of pixel values (e.g., 504) of an image captured by a photosensor pixel array (e.g., 300, 340 350, 360, 370, 502) of an image sensor (e.g., 130). The plurality of pixel values can include one or more pixel values corresponding to one or more SBP pixels (e.g., 215, 230, 300) in the photosensor pixel array and one or more saturated (e.g., undersaturated, oversaturated) pixel values corresponding to one or more other photosensor pixels (e.g., 200, 310) in the photosensor pixel array. The one or more other photosensor pixels can include photosensor pixels that are not sensitivity biased (e.g., that do not have a mask or filter, that do not have a modified aperture, that do not have a modified photon to electrical charge conversion rate, etc.).

In some cases, an SBP pixel from the one or more SBP pixels can include a photosensor pixel with a mask configured to filter a portion of light before the portion of light reaches the photosensor pixel, a photosensor pixel with a different aperture (e.g., a larger or smaller aperture) than the one or more other photosensor pixels in the photosensor pixel array (e.g., than photosensor pixels that are not sensitivity biased), and/or a photosensor pixel configured to convert photons to electrical charges at a modified rate (e.g., at a reduced or increased rate). Moreover, in some examples, the one or more saturated pixel values can include one or more undersaturated pixel values.

In some examples, at least some of the one or more SBP pixels can be located at one or more borders of the photosensor pixel array. The one or more borders can include a bottom row (e.g., a bottom border), a top row (e.g., a top border), a left column (e.g., a left border), and/or a right column (e.g., a right border). In some examples, at least some of the one or more SBP pixels can be located at one or more non-border regions (e.g., inner regions) of the photosensor pixel array.

In some cases, the one or more saturated pixel values can include oversaturated pixel values and the one or more SBP pixels can have a reduced light sensitivity. In some cases, the one or more saturated pixel values can include undersaturated pixel values and the one or more SBP pixels can have an increased light sensitivity.

In some cases, the one or more SBP pixels can include a first set of pixels and a second set of pixels. The first set of pixels can have a reduced light sensitivity and the second set of pixels can have an increased light sensitivity.

At block 604, the method 600 can include determining, based on the one or more pixel values corresponding to the one or more SBP pixels, an estimated actual pixel value for the one or more pixel values and/or the one or more saturated pixel values from the plurality of pixel values. In some examples, determining the estimated actual pixel value can include multiplying the one or more pixel values corresponding to the one or more SBP pixels by an SBP light sensitivity factor calculated based on a percentage of light the one or more SBP pixels are configured to filter. In some cases, the SBP light sensitivity factor can be a factor by which a light sensitivity of the one or more SBP pixels is adjusted.

For example, if the light sensitivity of the one or more SBP pixels is reduced by 1/n where n is a positive number that is greater than one, the light sensitivity factor can be n and the estimated actual pixel value can be calculated by multiplying the one or more pixel values corresponding to the one or more SBP pixels by n. If the light sensitivity of the one or more SBP pixels is increased by n where n is a positive number that is greater than one, the light sensitivity factor can be 1/n and the estimated actual pixel value can be calculated by multiplying the one or more pixel values corresponding to the one or more SBP pixels by 1/n.

At block 606, the method 600 can include determining an adjustment factor (also referred to as an adjustment value) for at least one of the plurality of pixel values based on the estimated actual pixel value and a target exposure value. In some examples, determining the adjustment factor can include dividing the target exposure value by the estimated actual pixel value.

At block 608, the method 600 can include correcting, based on the adjustment factor, an exposure setting associated with the image sensor and/or at least one of the plurality of pixel values. For example, in some cases, the method 600 can use the adjustment factor to correct the exposure setting associated with the image sensor. In some examples, the exposure setting can include an exposure time, a shutter speed, a gain, a lens aperture, a luminance, any combination thereof, and/or other exposure settings. In some cases, the method 600 can use the adjustment factor to correct at least some of the plurality of pixel values. For instance, the adjustment factor can be used to correct undersaturated/ oversaturated and/or oversaturated/overexposed pixel values, as described above. In some cases, the method 600 can use the adjustment factor to correct the exposure setting associated with the image sensor and also to correct at least some of the plurality of pixel values.

In some aspects, the method 600 can include generating the image based on the estimated actual pixel value, the one or more saturated pixel values, and/or at least a portion of the plurality of pixel values modified based on the adjustment factor.

In some aspects, the method 600 can include receiving a second plurality of pixel values of an additional image captured by the photosensor pixel array of the image sensor, wherein one or more additional pixel values correspond to one or more additional SBP pixels in the photosensor pixel array, and each SBP pixel from the one or more additional SBP pixels includes an SBP photosensor pixel without a light filter (e.g., a mask, a color filter), an SBP pixel with a larger aperture than other photosensor pixels in the photosensor pixel array, and/or an SBP photosensor pixel configured to convert photons to electrical charges at an increased rate; determining, based on the one or more additional pixel values, a second estimated actual pixel value for the one or more additional pixel values and/or one or more different pixel values from the second plurality of pixel values; and determining an additional adjustment factor for one or more undersaturated pixel values from the second plurality of pixel values based on the second estimated actual pixel value and a second target exposure value for the one or more undersaturated pixel values.

In some cases, the method 600 can further include based on the additional adjustment factor, correcting a second exposure setting associated with the image sensor and/or at least a portion of the second plurality of pixel values.

In some aspects, the method 600 can include identifying the one or more pixel values corresponding to the one or more SBP pixels. In some aspects, the method 600 can include determining the estimated actual pixel value and the adjustment factor based on the identified one or more pixel values corresponding to the one or more SBP pixels. In some examples, the one or more pixel values are identified based on a difference between the one or more pixel values and the one or more saturated pixel values, a location of the one or more SBP pixels, and/or a location of the one or more pixel values within an image array including the plurality of pixel values.

In some examples, the method 600 may be performed by one or more computing devices or apparatuses. In one illustrative example, the method 600 can be performed by the image capture and processing system 100 shown in FIG. 1 and/or one or more computing devices with the architecture of the computing device 700 shown in FIG. 7. In some cases, such a computing device or apparatus may include a processor, microprocessor, microcomputer, or other component of a device that is configured to carry out the steps of the method 600. In some examples, such computing device or apparatus may include one or more sensors configured to capture image data. For example, the computing device can include a smartphone, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The method 600 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the method 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 7 illustrates an example computing device architecture 700 of an example computing device which can implement various techniques described herein. For example, the computing device architecture 700 can implement at least some portions of the image capture and processing system 100 shown in FIG. 1, and perform sHDR operations as described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service stored in storage device 730 and configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device. In some instances, multimodal computing devices can enable a user to provide multiple types of input to communicate with the computing device architecture 700. The communication interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include software, code, firmware, etc., for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method of processing image data, the method comprising: receiving a plurality of pixel values of an image captured by a photosensor pixel array of an image sensor, wherein One or more pixel values from the plurality of pixel values correspond to one or more sensitivity-biased photosensor (SBP) pixels in the photosensor pixel array, and wherein one or more saturated pixel values from the plurality of pixel values correspond to one or more other photosensor pixels in the photosensor pixel array; determining, based on the one or more pixel values corresponding to the one or more SBP pixels, an estimated actual pixel value for at least one of the one or more pixel values and the one or more saturated pixel values from the plurality of pixel values; determining an adjustment factor for at least one of the plurality of pixel values based on the estimated as pixel value and a target exposure value; and based on the adjustment factor, correcting at least one of an exposure setting associated with the image sensor and the at least one of the plurality of pixel values.

Aspect 2: The method of Aspect 1, wherein determining the estimated actual pixel value comprises multiplying the one or more pixel values corresponding to the one or more SBP pixels by an SBP light sensitivity factor calculated based on a percentage of light the one or more SBP pixels are configured to filter.

Aspect 3: The method of any of Aspects 1 or 2, wherein determining the adjustment factor comprises dividing the target exposure value by the estimated actual pixel value.

Aspect 4: The method of any of Aspects 1 to 3, wherein each SBP pixel from the one or more SBP pixels comprises at least one of a photosensor pixel with a mask configured to filter a portion of light before the portion of light reaches the photosensor pixel, a photosensor pixel with a different aperture than the one or more other photosensor pixels in the photosensor pixel array, and a photosensor pixel configured to convert photons to electrical charges at a modified rate.

Aspect 5: The method of any of Aspects 1 to 4, wherein the one or more SBP pixels are located at one or more borders of the photosensor pixel array, the one or more borders comprising at least one of a bottom row, a top row, a left column, and a right column.

Aspect 6: The method of any of Aspects 1 to 5, wherein the one or more SBP pixels are located at one or more non-border regions of the photosensor pixel array.

Aspect 7: The method of any of Aspects 1 to 6, further comprising generating the image based on at least one of the estimated actual pixel value, the one or more saturated pixel values, and at least a portion of the plurality of pixel values modified based on the adjustment factor.

Aspect 8: The method of any of Aspects 1 to 7, wherein the one or more saturated pixel values comprise oversaturated pixel values and wherein the one or more SBP pixels have a reduced light sensitivity.

Aspect 9: The method of any of Aspects 1 to 8, wherein the one or more SBP pixels comprise at least one of an SBP photosensor pixel without a light filter, an SBP pixel with a larger aperture than other photosensor pixels in the photosensor pixel array, and an SBP photosensor pixel configured to convert photons to electrical charges at an increased rate, and wherein the one or more saturated pixel values comprise one or more undersaturated pixel values.

Aspect 10: The method of any of Aspects 1 to 9, wherein the one or more SBP pixels comprise a first set of pixels and a second set of pixels, wherein the first set of pixels have a reduced light sensitivity, and wherein the second set of pixels have an increased light sensitivity.

Aspect 11: The method of any of Aspects 1 to 10, further comprising: identifying the one or more pixel values corresponding to the one or more SBP pixels, wherein the one or more pixel values are identified based on at least one of a difference between the one or more pixel values and the one or more saturated pixel values, a location of the one or more SBP pixels, and a location of the one or more pixel values within an image array comprising the plurality of pixel values.

Aspect 12: An apparatus for processing image data, the apparatus comprising: memory; and one or more processors coupled to the memory, the one or more processors being configured to: receive a plurality of pixel values of an image captured by a photosensor pixel array of an image sensor, Wherein one or more pixel values from the plurality of pixel values correspond to one or more sensitivity-biased photosensor (SBP) pixels in the photosensor pixel array, and wherein one or more saturated pixel values from the plurality of pixel values correspond to one or more other photosensor pixels in the photosensor pixel array; determine, based on the one or more pixel values corresponding to the one or more SBP pixels, an estimated actual pixel value for at least one of the one or more pixel values and the one or more saturated pixel values from the plurality of pixel values; determine, an adjustment factor for at least one of the plurality of pixel values based on the estimated actual pixel value and a target exposure value; and based on the adjustment factor, correct at least one of an exposure setting associated with the image sensor and the at least one of the plurality of pixel values.

Aspect 13: The apparatus of Aspect 12, wherein determining the estimated actual pixel value comprises multiplying the one or more pixel values corresponding to the one or more SBP pixels by an SBP light sensitivity factor calculated based on a percentage of light the one or more SBP pixels are configured to filter.

Aspect 14: The apparatus of any of Aspects 12 or 13, wherein determining the adjustment factor comprises dividing the target exposure value by the estimated actual pixel value.

Aspect 15: The apparatus of any of Aspects 12 to 14, wherein each SBP pixel from the one or more SBP pixels comprises at least one of a photosensor pixel with a mask configured to filter a portion of light before, the portion of light reaches the photosensor pixel, a photosensor pixel with a different aperture than the one or more other photosensor pixels in the photosensor pixel array, and a photosensor pixel configured to convert photons to electrical charges at a modified rate.

Aspect 16: The apparatus of any of Aspects 12 to 15, wherein the one or more SBP pixels are located at one or more borders of the photosensor pixel array, the one or more borders comprising at least one of a bottom row, a top row, a left column, and a right column.

Aspect 17: The apparatus of any of Aspects 12 to 16, wherein the one or more SBP pixels are located at one or more non-border regions of the photosensor pixel array.

Aspect 18: The apparatus of any of Aspects 12 to 17, wherein the one or more processors are configured to: generate the image based on at least one of the estimated actual pixel value, the one or more saturated pixel values, and at least a portion of the plurality of pixel values modified based on the adjustment factor.

Aspect 19: The apparatus of any of Aspects 12 to 18, wherein the one or more saturated pixel values comprise oversaturated pixel values and wherein the one or more SBP pixels have a reduced light sensitivity.

Aspect 20: The apparatus of any of Aspects 12 to 19, wherein the one or more SBP pixels comprise at least one of an SBP photosensor pixel without a light filter, an SBP pixel with a larger aperture than other photosensor pixels in the photosensor pixel array, and an SBP photosensor pixel configured to convert photons to electrical charges at an increased rate, and wherein the one or more saturated pixel values comprise one or more undersaturated pixel values.

Aspect 21: The apparatus of any of Aspects 12 to 20, wherein the one or more SBP pixels comprise a first set of pixels and a second set of pixels, wherein the first set of pixels have a reduced light sensitivity, and wherein the second set of pixels have an increased light sensitivity.

Aspect 22: The apparatus of any of Aspects 12 to 21, wherein the one or more processors are configured to: identify the one or more pixel values corresponding to the one or more SBP pixels, wherein the one or more pixel values are identified based on at least one of a difference between the one or more pixel values and the one or more saturated pixel values, a location of the one or more SBP pixels, and a location of the one or more pixel values within an image array comprising the plurality of pixel values; and determine the estimated actual pixel value and the adjustment factor at least partly based on the one or more pixel values corresponding to the one or more SBP Aspect 23: The apparatus of any of Aspects 12 to 22, wherein the apparatus is a mobile device.

Aspect 24: The apparatus of any of Aspects 12 to 23, wherein the apparatus is a camera device.

Aspect 25: The apparatus of any of Aspects 12 to 24, further comprising at least one of a display and an image sensor.

Aspect 26: A non-transitory computer-readable medium having stored thereon instructions which, when executed by one or more processors, cause the one or more processors to perform operations according to any of Aspects 1 to 24.

Aspect 27: An apparatus comprising one or more means for performing operations according to any of Aspects 1 to 24.

What is claimed is:

1. A method of processing image data, the method comprising:
   receiving a plurality of pixel values of an image captured by a photosensor pixel array of an image sensor, wherein one or more pixel values from the plurality of pixel values correspond to one or more sensitivity-biased photosensor (SBP) pixels in the photosensor pixel array, and wherein one or more saturated pixel values from the plurality of pixel values correspond to one or more other photosensor pixels in the photosensor pixel array;
   determining, based on the one or more pixel values corresponding to the one or more SBP pixels and based on an amount of light the one or more SBP pixels are configured to filter, an estimated actual pixel value for at least one of the one or more pixel values or the one or more saturated pixel values from the plurality of pixel values;
   determining an adjustment factor for at least one of the plurality of pixel values based on the estimated actual pixel value and a target exposure value; and based on the adjustment factor, correcting at least one of an exposure setting associated with the image sensor or the at least one of the plurality of pixel values.

2. The method of claim 1, wherein determining the estimated actual pixel value comprises multiplying the one or more pixel values corresponding to the one or more SBP pixels by an SBP light sensitivity factor calculated based on the amount of light the one or more SBP pixels are configured to filter.

3. The method of claim 1, wherein determining the adjustment factor comprises dividing the target exposure value by the estimated actual pixel value.

4. The method of claim 1, wherein each SBP pixel from the one or more SBP pixels comprises at least one of a photosensor pixel with a mask configured to filter a portion of light before the portion of light reaches the photosensor pixel, a photosensor pixel with a different aperture than the one or more other photosensor pixels in the photosensor pixel array, or a photosensor pixel configured to convert photons to electrical charges at a modified rate.

5. The method of claim 1, wherein the one or more SBP pixels are located at one or more borders of the photosensor pixel array, the one or more borders comprising at least one of a bottom row, a top row, a left column, or a right column.

6. The method of claim 1, wherein the one or more SBP pixels are located at one or more non-border regions of the photosensor pixel array.

7. The method of claim 1, further comprising generating the image based on at least one of the estimated actual pixel value, the one or more saturated pixel values, or at least a portion of the plurality of pixel values modified based on the adjustment factor.

8. The method of claim 1, wherein the one or more saturated pixel values comprise oversaturated pixel values and wherein the one or more SBP pixels have a reduced light sensitivity.

9. The method of claim 1, wherein the one or more SBP pixels comprise at least one of an SBP photosensor pixel without a light filter, an SBP pixel with a larger aperture than other photosensor pixels in the photosensor pixel array, or an SBP photosensor pixel configured to convert photons to electrical charges at an increased rate, and wherein the one or more saturated pixel values comprise one or more undersaturated pixel values.

10. The method of claim 1, wherein the one or more SBP pixels comprise a first set of pixels and a second set of pixels, wherein the first set of pixels have a reduced light sensitivity, and wherein the second set of pixels have an increased light sensitivity.

11. The method of claim 1, further comprising:
identifying the one or more pixel values corresponding to the one or more SBP pixels, wherein the one or more pixel values are identified based on at least one of a difference between the one or more pixel values and the one or more saturated pixel values, a location of the one or more SBP pixels, or a location of the one or more pixel values within an image array comprising the plurality of pixel values.

12. An apparatus for processing image data, the apparatus comprising:
memory; and
one or more processors coupled to the memory, the one or more processors being configured to:
receive a plurality of pixel values of an image captured by a photosensor pixel array of an image sensor, wherein one or more pixel values from the plurality of pixel values correspond to one or more sensitivity-biased photosensor (SBP) pixels in the photosensor pixel array, and wherein one or more saturated pixel values from the plurality of pixel values correspond to one or more other photosensor pixels in the photosensor pixel array;
determine, based on the one or more pixel values corresponding to the one or more SBP pixels and based on an amount of light the one or more SBP pixels are configured to filter, an estimated actual pixel value for at least one of the one or more pixel values or the one or more saturated pixel values from the plurality of pixel values;
determine an adjustment factor for at least one of the plurality of pixel values based on the estimated actual pixel value and a target exposure value; and
based on the adjustment factor, correct at least one of an exposure setting associated with the image sensor or the at least one of the plurality of pixel values.

13. The apparatus of claim 12, wherein, to determine the estimated actual pixel value, the one or more processors are configured to multiply the one or more pixel values corresponding to the one or more SBP pixels by an SBP light sensitivity factor calculated based on the amount of light the one or more SBP pixels are configured to filter.

14. The apparatus of claim 12, wherein, to determine the adjustment factor, the one or more processors are configured to divide the target exposure value by the estimated actual pixel value.

15. The apparatus of claim 12, wherein each SBP pixel from the one or more SBP pixels comprises at least one of a photosensor pixel with a mask configured to filter a portion of light before the portion of light reaches the photosensor pixel, a photosensor pixel with a different aperture than the one or more other photosensor pixels in the photosensor pixel array, or a photosensor pixel configured to convert photons to electrical charges at a modified rate.

16. The apparatus of claim 12, wherein the one or more SBP pixels are located at one or more borders of the photosensor pixel array, the one or more borders comprising at least one of a bottom row, a top row, a left column, or a right column.

17. The apparatus of claim 12, wherein the one or more SBP pixels are located at one or more non-border regions of the photosensor pixel array.

18. The apparatus of claim 12, wherein the one or more processors are configured to:
generate the image based on at least one of the estimated actual pixel value, the one or more saturated pixel values, or at least a portion of the plurality of pixel values modified based on the adjustment factor.

19. The apparatus of claim 12, wherein the one or more saturated pixel values comprise oversaturated pixel values and wherein the one or more SBP pixels have a reduced light sensitivity.

20. The apparatus of claim 12, wherein the one or more SBP pixels comprise at least one of an SBP photosensor pixel without a light filter, an SBP pixel with a larger aperture than other photosensor pixels in the photosensor pixel array, or an SBP photosensor pixel configured to convert photons to electrical charges at an increased rate, and wherein the one or more saturated pixel values comprise one or more undersaturated pixel values.

21. The apparatus of claim 12, wherein the one or more SBP pixels comprise a first set of pixels and a second set of pixels, wherein the first set of pixels have a reduced light sensitivity, and wherein the second set of pixels have an increased light sensitivity.

22. The apparatus of claim 12, wherein the one or more processors are configured to:
- identify the one or more pixel values corresponding to the one or more SBP pixels, wherein the one or more pixel values are identified based on at least one of a difference between the one or more pixel values and the one or more saturated pixel values, a location of the one or more SBP pixels, or a location of the one or more pixel values within an image array comprising the plurality of pixel values; and
- determine the estimated actual pixel value and the adjustment factor at least partly based on the one or more pixel values corresponding to the one or more SBP pixels.

23. The apparatus of claim 12, wherein the apparatus is a mobile device.

24. The apparatus of claim 12, wherein the apparatus is a camera device.

25. The apparatus of claim 12, further comprising at least one of a display or an image sensor.

26. A non-transitory computer-readable medium having stored thereon instructions which, when executed by one or more processors, cause the one or more processors to:
- receive a plurality of pixel values of an image captured by a photosensor pixel array of an image sensor, wherein one or more pixel values from the plurality of pixel values correspond to one or more sensitivity-biased photosensor (SBP) pixels in the photosensor pixel array, and wherein one or more saturated pixel values from the plurality of pixel values correspond to one or more other photosensor pixels in the photosensor pixel array;
- determine, based on the one or more pixel values corresponding to the one or more SBP pixels and based on an amount of light the one or more SBP pixels are configured to filter, an estimated actual pixel value for at least one of the one or more pixel values or the one or more saturated pixel values from the plurality of pixel values;
- determine an adjustment factor for at least one of the plurality of pixel values based on the estimated actual pixel value and a target exposure value; and
- based on the adjustment factor, correct at least one of an exposure setting associated with the image sensor or the at least one of the plurality of pixel values.

27. The non-transitory computer-readable medium of claim 26, wherein, to determine the estimated actual pixel value, the instructions, when executed by the one or more processors, cause the one or more processors to multiply the one or more pixel values corresponding to the one or more SBP pixels by an SBP light sensitivity factor calculated based on the amount of light the one or more SBP pixels are configured to filter.

28. The non-transitory computer-readable medium of claim 26, wherein, to determine the adjustment factor, the instructions, when executed by the one or more processors, cause the one or more processors to divide the target exposure value by the estimated actual pixel value.

29. The non-transitory computer-readable medium of claim 26, wherein each SBP pixel from the one or more SBP pixels comprises at least one of a photosensor pixel with a mask configured to filter a portion of light before the portion of light reaches the photosensor pixel, a photosensor pixel with a different aperture than the one or more other photosensor pixels in the photosensor pixel array, or a photosensor pixel configured to convert photons to electrical charges at a modified rate.

30. The non-transitory computer-readable medium of claim 26, wherein the instructions, when executed by the one or more processors, cause the one or more processors to:
- generate the image based on at least one of the estimated actual pixel value, the one or more saturated pixel values, or at least a portion of the plurality of pixel values modified based on the adjustment factor.

* * * * *